(12) United States Patent
Fujii

(10) Patent No.: US 6,961,452 B2
(45) Date of Patent: Nov. 1, 2005

(54) FINGERPRINT DATA SYNTHESIS METHOD, FINGERPRINT DATA SYNTHESIS APPARATUS AND COMPUTER-READABLE RECORDING MEDIUM ON WHICH FINGERPRINT DATA SYNTHESIS PROGRAM IS RECORDED AS WELL AS BIOMETRIC INFORMATION SYNTHESIS METHOD

(75) Inventor: Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 782 days.

(21) Appl. No.: 09/803,155

(22) Filed: Mar. 12, 2001

(65) Prior Publication Data

US 2001/0031075 A1 Oct. 18, 2001

(30) Foreign Application Priority Data

Mar. 31, 2000 (JP) .................................... 2000-098044
Feb. 23, 2001 (JP) .................................... 2001-047965

(51) Int. Cl.$^7$ ............................................. G06K 9/00
(52) U.S. Cl. ................................................... 382/125
(58) Field of Search ................................ 382/125, 116, 382/124, 216, 284, 294; 283/68, 69, 78; 396/15; 902/3; 713/186; 340/5.52, 5.53, 5.83

(56) References Cited

U.S. PATENT DOCUMENTS 5,524,161 A * 6/1996 Omori et al. ............... 382/125
5,572,597 A * 11/1996 Chang et al. ............... 382/125
6,072,895 A * 6/2000 Bolle et al. ................. 382/125
6,233,348 B1 * 5/2001 Fujii et al. .................. 382/125
6,459,804 B2 * 10/2002 Mainguet .................... 382/124
6,546,122 B1 * 4/2003 Russo ......................... 382/125
6,567,765 B1 * 5/2003 Wu et al. .................... 702/182
6,597,802 B1 * 7/2003 Bolle et al. ................. 382/124
6,668,072 B1 * 12/2003 Hribernig et al. .......... 382/124

* cited by examiner

*Primary Examiner*—Andrew W. Johns
*Assistant Examiner*—Shervin Nakhjavan
(74) *Attorney, Agent, or Firm*—Staas & Halsey LLP

(57) ABSTRACT

The invention achieves stabilization of the verification performance and augmentation of the verification performance. The fingerprint data synthesis apparatus includes a fingerprint data extraction section for extracting minutiae from each of a plurality of fingerprint images to produce fingerprint data, a fingerprint data storage section for storing the fingerprint data, a common minutia searching section for investigating a correspondence of the minutiae between the plurality of fingerprint data to search for the same minutiae included commonly in two or more of the plurality of fingerprint data as common minutiae, a fingerprint data synthesis section for selecting one of the common minutiae as a minutia representative of the common minutiae to produce one synthetic fingerprint data, and a validation section for validating the synthetic fingerprint data. The apparatus is applied to production of fingerprint data used in a system which identifies an individual.

30 Claims, 24 Drawing Sheets

● MINUTIA

● MINUTIA

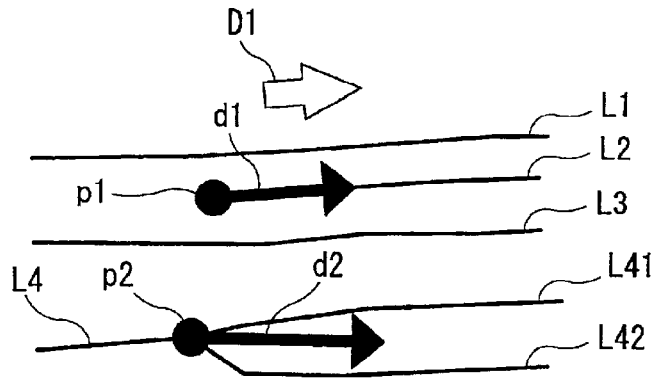
FIG. 12A
FIG. 12B
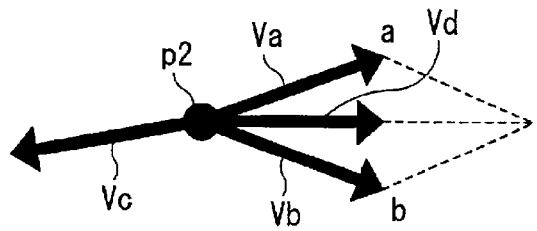
FIG. 12C
FIG. 13
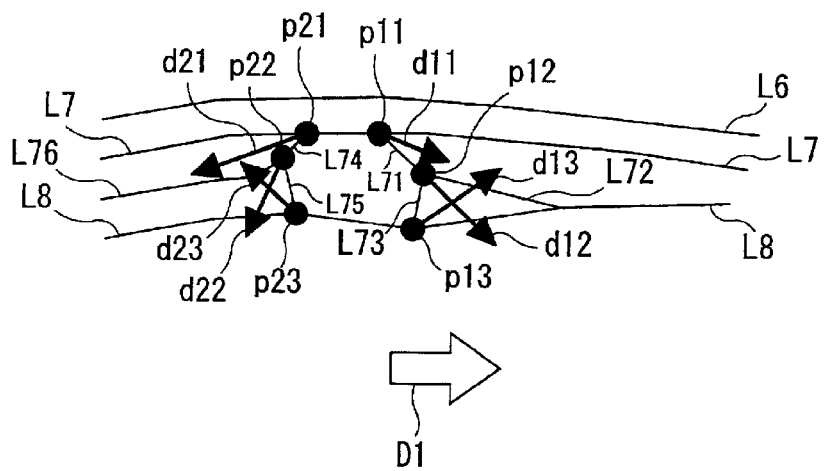

□ CORRECT MINUTIA
○ FALSE MINUTIA

FIG. 23A  FIG. 23B  FIG. 23C
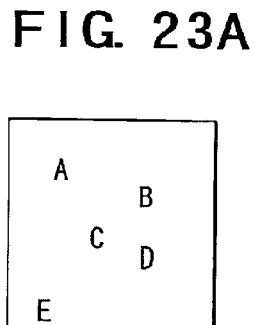
FINGERPRINT DATA F1
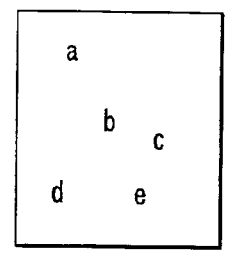
FINGERPRINT DATA F2
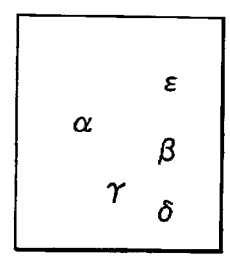
FINGERPRINT DATA F3
FIG. 24A  FIG. 24B  FIG. 24C
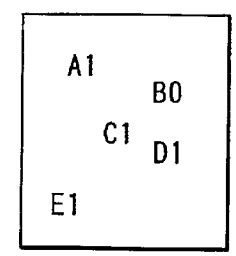
FINGERPRINT DATA F1
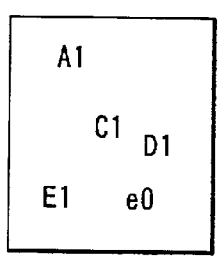
FINGERPRINT DATA F2
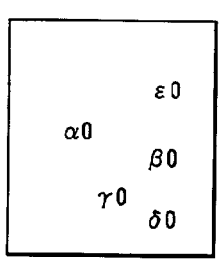
FINGERPRINT DATA F3

FIG. 25A    FIG. 25B    FIG. 25C
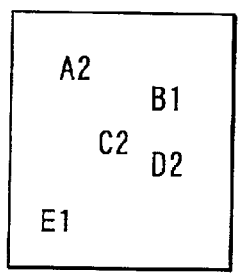
FINGERPRINT DATA F1
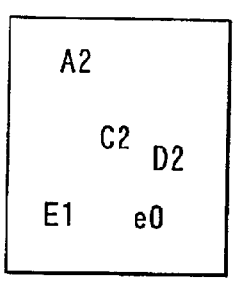
FINGERPRINT DATA F2
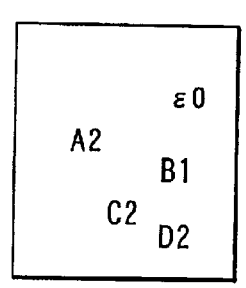
FINGERPRINT DATA F3
FIG. 26A    FIG. 26B    FIG. 26C
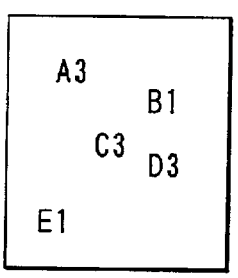
FINGERPRINT DATA F1
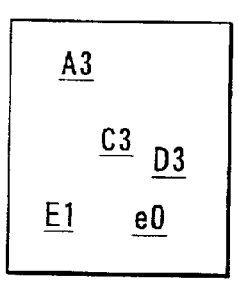
FINGERPRINT DATA F2
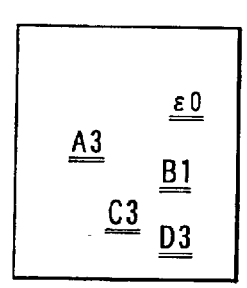
FINGERPRINT DATA F3

SYNTHETIC FINGERPRINT DATA

FINGERPRINT DATA F_N

SYNTHETIC FINGERPRINT DATA R

C : COMMON MINUTIA
A, B : MINUTIA NOT COMMON
P : MINUTIA TO BE SYNTHESIZED
P̲ : SYNTHESIZED MINUTIA

FIG. 34A    FIG. 34B    FIG. 34C
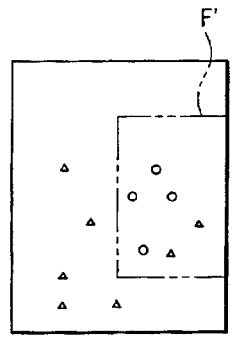
FINGERPRINT DATA FA
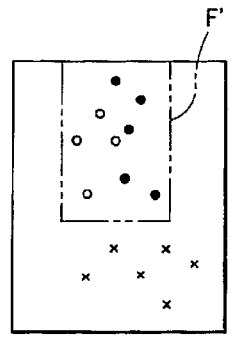
FINGERPRINT DATA FB
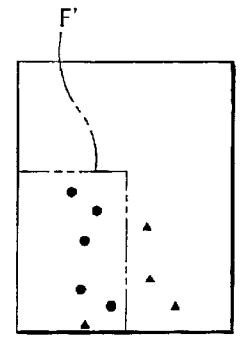
FINGERPRINT DATA FC
FIG. 34D
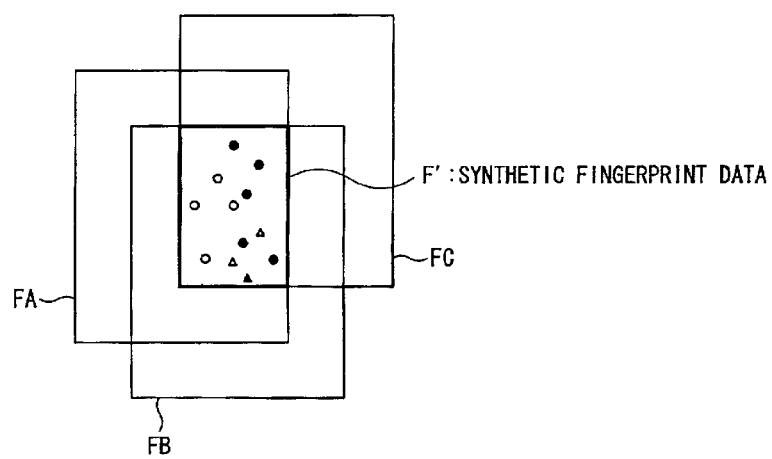
○ : MINUTIA EXISTING IN BOTH OF FA & FB
● : MINUTIA EXISTING IN BOTH OF FB & FC
△ : MINUTIA EXISTING IN FA ONLY
× : MINUTIA EXISTING IN FB ONLY
▲ : MINUTIA EXISTING IN FC ONLY

FINGERPRINT DATA SYNTHESIS METHOD, FINGERPRINT DATA SYNTHESIS APPARATUS AND COMPUTER-READABLE RECORDING MEDIUM ON WHICH FINGERPRINT DATA SYNTHESIS PROGRAM IS RECORDED AS WELL AS BIOMETRIC INFORMATION SYNTHESIS METHOD

BACKGROUND OF THE INVENTION

1) Field of the Invention

This invention relates to a fingerprint data synthesis method and apparatus as well as a computer-readable recording medium on which a fingerprint data synthesis program is recorded for producing fingerprint data to identify an individual. The present invention relates also to a biometric information synthesis method for producing biometric information which uses not only a fingerprint but also other biometric information such as, for example, a palm print, a finger shape, a palm shape, voice, the retina, the iris, a face picture, a dynamic signature, a blood vessel pattern or a keystroke to identify an individual.

2) Description of the Related Art

In recent years, as extensive introduction of the computer into the social system proceeds, the concern is concentrated upon the security. Conventionally, an ID card or a password is used in order to identify the person itself to allow entry into a computer room or utilization of a terminal. However, such identification means still have many subjects to be solved in terms of the security.

Attention is paid to an individual identification technique which makes use of biometric information as means for identifying the person itself which is higher in reliability than the password. Identification of the person itself using biometric information unique to the individual provides very high reliability.

One of several kinds of biometric information which can be utilized for identification of the person itself is a fingerprint. The fingerprint has the two significant characteristics that "it is different among different people" and that "it does not change till the end of the person's life" and is considered powerful measures for identification of the person itself. In recent years, much effort has been directed to investigations and developments on an individual identification system which uses a fingerprint.

A fingerprint is a fine convex and concave geometry at a fingertip of a human being. A connection of convex portions is called ridge or ridgeline. If a ridge is traced, then a point (bifurcation) at which it is bifurcated or another point (end point) beyond which it does not extend anymore is reached. The distribution of such bifurcations or end points is quite different among different people, and therefore, such bifurcations and/or endpoints are called minutiae of a fingerprint. Verification of the distribution condition of such minutiae is used as effective means for specifying an individual. Upon fingerprint verification, coincidence of minutiae in terms of the position, type and direction is detected to discriminate whether or not two fingerprints are the same as each other.

A system for identifying an individual using a fingerprint uses fingerprint images of individuals registered in advance therein. In particular, a user (individual) of the system inputs its fingerprint image by means of a fingerprint scanner, and minutia data (fingerprint data, organism characteristic data) are extracted from the fingerprint image by and registered into the system. Then, when a fingerprint image is inputted using a fingerprint scanner for the object of verification, the system extracts minutia data as fingerprint data from the inputted fingerprint image and verifies the fingerprint data with the fingerprint data registered in advance therein.

Generally, a fingerprint pattern is picked up in the form of a fingerprint image by picking up an image obtained with a fingertip contacted with a special optical system by means of a CCD camera or by detecting only convex portions of the skin by means of an electric capacity sensor. However, depending upon the condition of a fingertip when a fingerprint pattern is picked up, an image which does not exhibit a clear fingerprint such as a blurred fingerprint or a fingerprint image on which ridges look adhered to each other due to sweat may be obtained.

Upon production and registration of registration fingerprint data, if fingerprint data is produced from a fingerprint image on which a fingerprint does not look clearly, then much false minutia information is included in the fingerprint data, which deteriorates the verification performance. Meanwhile, if the inputting area of the fingerprint scanner is not sufficiently large, then the fingerprint pickup area is not fixed every time, which sometimes deteriorates the stability of the verification performance.

Accordingly, fingerprint data produced using a fingerprint image on which a fingerprint pattern looks as clearly as possible is preferably used as registration fingerprint data to be registered in advance in the system. Where such fingerprint data is used, stability of the verification performance and augmentation of the verification success ratio (or lowering of FRR (false rejection rate)) can be anticipated.

Therefore, in order to produce registration fingerprint data, typically it is a conventional practice to pick up a fingerprint image of the same fingertip several times and select one of the resulting fingerprint images on which the fingerprint looks most clearly or to pick up a fingerprint pattern separately for a plurality of divisional portions to obtain a plurality of partial fingerprint images and overlap the partial fingerprint images with each other to produce a fingerprint image on which the fingerprint pattern is exhibited fully over a wide range. Also it is a conventional practice to pick up a fingerprint image of the same fingertip several times, clip, from each of the picked up fingerprint images, a region in which the fingerprint looks clearly and combine the regions clipped from the fingerprint images to produce a fingerprint image of the entire fingerprint.

However, even if a fingerprint image of the same fingertip is picked up by a plurality of times, a fingerprint image or images on which the entire fingerprint image looks clearly cannot always be obtained, and it is often the case that each of the plurality of fingerprint images has some unclear portion. Accordingly, even if one of the plurality of fingerprint images on which the fingerprint looks most clearly is selected, it cannot be avoided that some unclear portions are included in the selected fingerprint image.

On the other hand, if a region in which a fingerprint looks clearly is clipped from each of a plurality of fingerprint images and such regions are synthesized to produce an image of the entire fingerprint, then the synthesis rather destroys the structure of fingerprint ridges and therefore makes the fingerprint image unclear. Particularly when two regions extracted from two different fingerprint images are synthesized, ridges in the regions cannot sometimes be connected well to each other, resulting in destruction of the ridge structure.

As described above, it is difficult to accurately extract characteristics unique to an individual from a fingerprint image which includes an unclear portion, and even if minutiae are extracted from such a fingerprint image as just described to produce registration fingerprint data, deterioration of the verification performance cannot be avoided.

SUMMARY OF THE INVENTION

It is an object of the present invention to provide a fingerprint data synthesis method, a fingerprint data synthesis apparatus and a computer-readable recording medium as well as a biometric information synthesis method by which minutiae (biometric information) extracted from different fingerprint images are synthesized to produce fingerprint data to achieve stabilization of the verification performance and augmentation of the verification performance.

In order to attain the object described above, according to an aspect of the present invention, there is provided a fingerprint data synthesis method, comprising the steps of extracting minutiae from each of a plurality of fingerprint images to produce fingerprint data including information regarding the minutiae for each of the fingerprint images, investigating a correspondence of the minutiae between the plurality of fingerprint data to search for the same minutiae included commonly in two or more of the plurality of fingerprint data as common minutiae, selecting one of the common minutiae as a minutia representative of the common minutiae to synthesize the plurality of fingerprint data to produce one synthetic fingerprint data, and validating the synthetic fingerprint data.

According to another aspect of the present invention, there is provided a fingerprint data synthesis apparatus, comprising a fingerprint data extraction section for extracting minutiae from each of a plurality of fingerprint images to produce fingerprint data including information regarding the minutiae for each of the fingerprint images, a fingerprint data storage section for storing the plurality of fingerprint data produced by the fingerprint data extraction section, a common minutia searching section for investigating a correspondence of the minutiae between the plurality of fingerprint data to search for the same minutiae included commonly in two or more of the plurality of fingerprint data as common minutiae, a fingerprint data synthesis section for selecting one of the common minutiae as a minutia representative of the common minutiae to synthesize the plurality of fingerprint data to produce one synthetic fingerprint data, and a validation section for validating the synthetic fingerprint data.

The validation section may confirm at least one of validity of a range of presence of the minutiae in the synthetic fingerprint data, validity of one-sidedness of presence of the minutiae in the synthetic fingerprint data, validity of relational information between the minutiae in the synthetic fingerprint data and validity of the number of the minutiae in the synthetic fingerprint data to validate the synthetic fingerprint data. In this instance, the validation section may numerically evaluate and confirm any of the criteria of validity and determines the validity of the synthetic fingerprint data based on the evaluation value or values of the validity.

The fingerprint data synthesis apparatus may further comprise a minutia reliability calculation section for calculating a reliability value of each of the minutiae of the plurality of fingerprint data, and the fingerprint data synthesis section may select the minutia representative of the common minutiae based on the reliability values calculated by the minutia reliability calculation section. In this instance, the minutia reliability calculation section may calculate the reliability value of each of the minutiae based on a difference between an orientation of the minutia and an orientation of a ridge, or calculate the reliability value of each of the minutiae based on a length of a ridge or a distance from the minutia to a neighboring minutia, or else calculate the reliability value of each of the minutiae based on a distance from the minutia to a neighboring ridge, or otherwise calculate the reliability value of each of the minutiae based on a positional relationship of the minutia to a neighboring minutia.

The fingerprint data synthesis apparatus may further comprise a verification section for verifying the plurality of fingerprint data, and the minutia reliability calculation section may calculate, for each of the minutiae in the plurality of fingerprint data, a verification coincidence evaluation value for evaluation of verification coincidence possibility of the minutia as the reliability value based on a result of the verification by the verification section. In this instance, the minutia reliability calculation section may calculate the verification coincidence evaluation value based on at least one of results of verification of two minutiae of an object of verification with regard to a position, a type and an orientation by the verification section, or calculate the verification coincidence evaluation value based on a result of verification of two minutiae of an object of verification with regard to relational information between each of the verification object minutiae and another minutia by the verification section, or else calculate the number of times of verification coincidence of each of the minutiae as the verification coincidence evaluation value.

The relational information may be at least one of a position, a type and an orientation of the other minutia, or the number of ridges from each of the minutiae of the verification object to the other minutia, or else a connection pattern from each of the minutiae of the verification object to the other minutia along a ridge.

The minutia reliability calculation section may modify the reliability value of each of the minutiae based on the reliability value or values of a neighboring minutia or minutiae. The verification section may function also as the common minutia searching section.

The fingerprint data synthesis section may refer to a result of the verification of relational information between each of the minutiae and another minutia by the verification section, and collects that relational information which has high reliability to produce synthesized relational information, and use the synthesized relational information as the relational information of the minutiae from which the synthetic fingerprint data are formed.

When the fingerprint data synthesis section produces the synthetic fingerprint data, the fingerprint data synthesis section may perform positioning of the minutiae from which the synthetic fingerprint data are produced with reference to a minutia included commonly in the plurality of fingerprint data, or perform positioning of the minutiae from which the synthetic fingerprint data are produced with reference to the center of a fingerprint determined from each of the fingerprint images, or else perform positioning of the minutiae from which the synthetic fingerprint data are produced with reference to a minutia selected from among the minutiae included in the synthetic fingerprint data being produced.

According to a further aspect of the present invention, there is provided a computer-readable recording medium on which a fingerprint data synthesis program is recorded for causing a computer to function as a fingerprint data extraction section for extracting minutiae from each of a plurality of fingerprint images to produce fingerprint data including information regarding the minutiae for each of the fingerprint images, a common minutia searching section for investigating a correspondence of the minutiae between the plurality of fingerprint data to search for the same minutiae included commonly in two or more of the plurality of fingerprint data as common minutiae, a fingerprint data synthesis section for selecting one of the common minutiae as a minutia representative of the common minutiae to synthesize the plurality of fingerprint data to produce one synthetic fingerprint data, and a validation section for validating the synthetic fingerprint data.

According to a still further aspect of the present invention, there is provided a biometric information synthesis method, comprising the steps of extracting feature elements from each of a plurality of sets of raw biometric data obtained from the same organism to produce biometric information including information regarding the feature elements for each of the sets of raw biometric data, investigating a correspondence of the feature elements between the plurality of biometric information to search for the same feature elements included commonly in two or more of the sets of biometric information as common feature elements, selecting one of the common feature elements as a feature element representative of the common feature elements to synthesize the plurality of biometric information to produce one synthesized biometric information, and validating the synthesized biometric information.

With the fingerprint data synthesis method, the fingerprint data synthesis apparatus and the computer-readable recording medium on which a fingerprint data synthesis program is recorded, the following effects and advantages can be achieved.

(1) Minutiae are extracted from each of a plurality of fingerprint images and the minutiae extracted from the fingerprint images are synthesized to produce one synthetic fingerprint data. Consequently, the synthetic fingerprint data can be produced using the minutiae having high reliability. Further, since the fingerprint images need not be synthesized directly with each other, such a bad influence as destruction of a ridge structure can be eliminated.

Accordingly, fingerprint data which includes correct minutiae (minutiae having high reliability) extracted accurately from fingerprint images can be produced, and a high verification performance can be realized with a system which identifies an individual based on a fingerprint.

Further, since minutiae over a wide range can be extracted accurately from a plurality of fingerprint images picked up from different regions of a fingerprint to produce fingerprint data, a stable verification performance can be realized on the system described above.

Furthermore, since it is validated whether or not the synthetic fingerprint data is valid, only the fingerprint data whose synthesis result is valid can be used, and fingerprint authentication is performed using the fingerprint data which is high in reliability. Consequently, a higher verification performance can be realized.

(2) Since the validity of minutiae included in synthetic fingerprint data with regard to the range of existence, one-sidedness, relational information or the number is confirmed to validate the synthetic fingerprint data, synthetic fingerprint data obtained by fingerprint synthesis which has been performed in failure can be excluded with certainty taking various synthesis conditions into consideration. Consequently, fingerprint authentication can be achieved using fingerprint data of higher reliability, and the verification performance can be further augmented.

(3) Since reliability values of individual minutiae are calculated and a minutia which represents common minutiae is selected based on the reliability values, minutiae having high reliability can be selected readily as minutiae to be used to form synthetic fingerprint data. Accordingly, since false minutiae (minutiae whose reliability is low) are excluded and synthetic fingerprint data is re-constructed only from correct minutiae (minutiae whose reliability is high), synthetic fingerprint data having high reliability can be produced readily.

(4) Since a plurality of fingerprint data are verified with each other and a verification coincidence evaluation value based on a result of the verification is calculated as a reliability value of each minutia, a reliability value which reflects a verification algorithm for fingerprints can be calculated. If minutiae are selected based on such reliability values and used for production of synthetic fingerprint data, then the fingerprint verification performance is augmented obviously.

(5) If a verification coincidence evaluation value as a minutia reliability value is introduced from a verification result of minutia relational data (the position, type, or orientation, relational information) or a number of times of verification coincidence, then the verification coincidence evaluation values of minutiae having good repeatability and minutiae having poor repeatability exhibit significant differences. This facilitates discrimination of false minutiae, and consequently, synthetic fingerprint data having high reliability can be produced readily and with certainty.

(6) If a high reliability value is obtained unexpectedly as a result of calculation with regard to a certain noticed minutia although a large number of false minutiae (minutiae having low reliability) are present around the noticed minutia, then the noticed minutia has a high degree of possibility that it is a false minutia. Therefore, it is desirable to exclude the noticed minutia from the object of selection. Accordingly, the reliability value of the noticed minutia is modified in accordance with the reliability values of the neighboring minutiae. This makes the reliability values of the neighboring minutiae reflected on the reliability value of the noticed minutia and allows the minutia, which is a false minutia with a high degree of probability, to be excluded from the object of selection. Consequently, synthetic fingerprint data of high reliability can be produced with a higher degree of certainty.

(7) Synthetic relational information produced by referring to a result of verification of relational information between each minutia and another minutia to collect minutia relational data having high reliability is used as relational information of minutiae from which synthetic fingerprint data are to be formed. Consequently, the relational information of the minutiae from which the synthetic fingerprint data is to be formed can be modified so as to have a higher degree of reliability. Consequently, synthetic fingerprint data of high reliability can be produced with a higher degree of certainty.

(8) A minutia included commonly in a plurality of fingerprint data or the center of a fingerprint determined from a fingerprint image is used as a reference for positioning. Consequently, positioning of minutiae selected from the plurality of fingerprint data can be performed readily, and synthetic fingerprint data can be produced readily and with certainty.

(9) A minutia selected suitably from among minutiae included already in synthetic fingerprint data being produced is used as a reference for positioning. Therefore, even if a plurality of fingerprint data include minutiae of regions which are different a little from each other, the selected minutiae can be positioned readily. Consequently, synthetic fingerprint data can be produced readily and with certainty.

According to a still further aspect of the present invention, there is provided a biometric information synthesis method, comprising the steps of extracting feature elements from each of a plurality of sets of raw biometric data to produce synthesized biometric information by synthesizing the extracted feature elements. Consequently, the synthetic biometric information can be produced using the feature elements having high reliability.

Accordingly, biometric information including correct feature elements (feature elements having high reliability) extracted accurately from raw biometric data can be produced, and a high verification performance can be realized with a system which identifies an individual based on raw biometric data.

Further, since feature elements over a wide range can be extracted accurately from a plurality of raw biometric data picked up from different regions of the same organism to produce biometric information, a stable verification performance can be realized on the system described above.

Furthermore, since it is validated whether or not the synthetic biometric information is valid, only the biometric information whose synthesis result is valid can be used, and biometric information authentication is performed using the biometric information which is high in reliability. Consequently, a higher verification performance can be realized.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 12A to 12C are schematic views illustrating definitions of the orientation of a minutia in the second embodiment;

FIGS. 13 and 14 are schematic views illustrating calculation schemes of a minutia reliability value in the second embodiment;

FIGS. 20A, 20B, 21A, 21B, 22A, 22B, 23A to 23C, 24A to 24C, 25A to 25C and 26A to 26C are schematic views illustrating calculation schemes of a minutia reliability value (verification coincidence evaluation value) in the third embodiment;

FIGS. 34A to 34D are schematic views illustrating a validation scheme of synthetic fingerprint data in the first embodiment.

DESCRIPTION OF THE PREFERRED EMBODIMENTS

[1] First Embodiment

Figure 1:
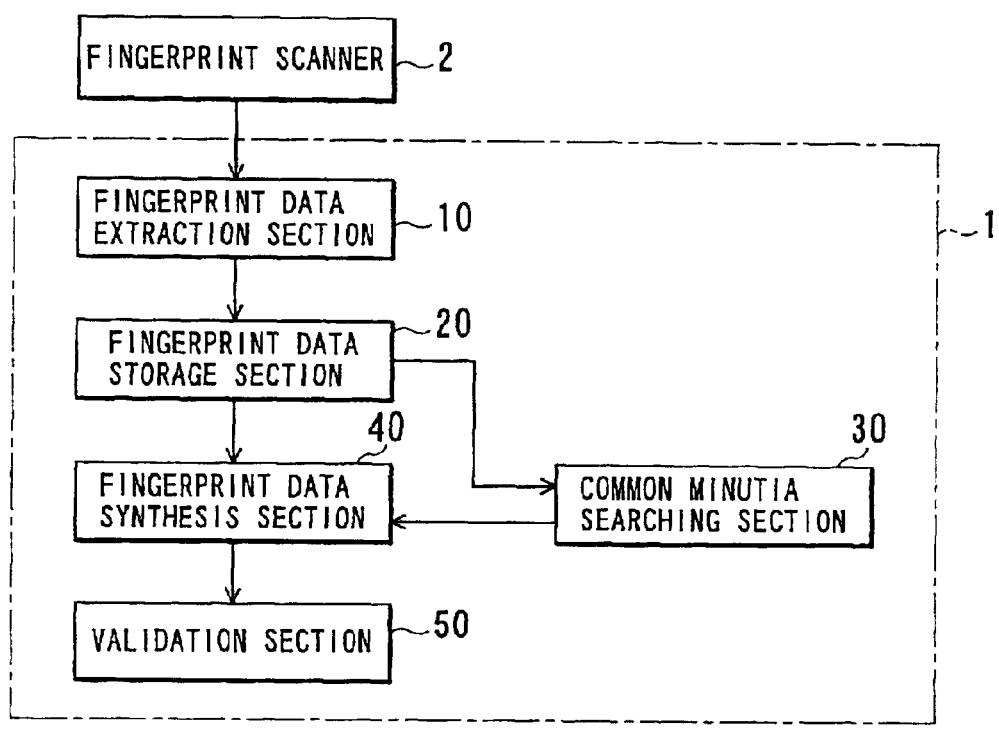
FIG. 1 is a block diagram showing a functional construction of a fingerprint data synthesis apparatus as a first embodiment of the present invention.

FIG. 1 is a block diagram showing a functional construction of a fingerprint data synthesis apparatus as a first embodiment of the present invention. The fingerprint data synthesis apparatus 1 of the first embodiment shown in FIG. 1 includes a fingerprint data extraction section 10, a fingerprint data storage section 20, a common minutia searching section 30, a fingerprint data synthesis section 40 and a validation section 50.

The fingerprint data synthesis apparatus 1 of the present embodiment is implemented from a computer system such as a personal computer including a CPU, a RAM, a ROM and other elements connected to each other by a bus line.

In particular, the RAM and/or the ROM function as the fingerprint data storage section 20, and an application program for implementing the fingerprint data extraction section 10, common minutia searching section 30, fingerprint data synthesis section 40 and validation section 50 is stored in the RAM.

Then, the CPU executes the application program to implement functions (details are hereinafter described) as the fingerprint data extraction section 10, common minutia searching section 30, fingerprint data synthesis section 40 and validation section 50 to implement the fingerprint data synthesis apparatus 1 of the first embodiment.

The program for implementing the fingerprint data synthesis apparatus 1 of the first embodiment is provided in the form of a computer-readable recording medium such as, for example, a flexible disk or a CD-ROM on which it is recorded. The computer thus reads the program from the recording medium, transfers and stores the program to and into an internal storage apparatus or an external storage apparatus and reads out and uses the program. Alternatively, the program may be recorded onto a storage apparatus (recording medium) such as, for example, a magnetic disk, an optical disk or a magneto-optical disk and then provided from the storage apparatus to the computer over a communication path.

Where the functions of the fingerprint data synthesis apparatus 1 of the first embodiment are implemented by means of the computer, the program stored in the internal storage apparatus such as, for example, the RAM is executed by a microprocessor such as, for example, the CPU of the computer. At this time, the program recorded on the recording medium may be read directly and executed by the microprocessor.

It is to be noted that, in the present specification, the term "computer" is used to signify a computer which includes hardware and an operation system and in which the hardware operates under the control of the operation system. On the other hand, where the operation system is unnecessary and an application program by itself operates the hardware, the hardware itself corresponds to the computer. The hardware at least includes a microprocessor such as a CPU and means for reading a computer program recorded on a recording medium.

The application program mentioned above includes program codes for allowing such a computer as described above to implement the functions as the fingerprint data extraction section 10, common minutia searching section 30, fingerprint data synthesis section 40 and validation section 50. However, the functions may partially be implemented not by an application program but by the operation system.

Further, as the recording medium in the present embodiment, not only a flexible disk, a CD-ROM, a magnetic disk, an optical disk and a magneto-optical disk mentioned hereinabove, but also other various computer-readable media such as an IC card, a ROM cartridge, a magnetic tape, a punched card, an internal storage apparatus (a memory such as a RAM or a ROM) or an external storage apparatus of a computer, and a printed matter on which codes such as a bar code are printed can be utilized.

The fingerprint data synthesis apparatus 1 of the first embodiment shown in FIG. 1 is used to synthesize a plurality of fingerprint images to produce fingerprint data for verification (registration fingerprint data) to be used when individual authentication is performed actually in a system which identifies an individual using a fingerprint.

In the fingerprint data synthesis apparatus 1, the fingerprint data extraction section 10 is connected to a fingerprint scanner 2 and extracts minutiae from each of a plurality of fingerprint images from the fingerprint scanner 2 to produce fingerprint data including information regarding the minutiae for each of the fingerprint images.

A minutia is an end point (refer to FIG. 12A) or a bifurcation (refer to FIG. 12B) of a fingerprint ridge. Upon extraction of minutiae, the fingerprint data extraction section 10 extracts not only minutiae but also relational information including fingerprint ridge orientations and minutia distances as well as the numbers of ridges between the fingerprint minutiae from each fingerprint image.

The fingerprint scanner 2 picks up an image obtained with a fingertip contacted with a special optical system by means of a CCD camera or detects only convex portions of the skin by means of an electric capacity sensor to pick up a fingerprint pattern (fingerprint ridges) as a fingerprint image.

When a plurality of fingerprint images are to be picked up by means of the fingerprint scanner 2, a fingertip is contacted with a fingerprint inputting region (refer to reference numeral 100 in FIGS. 6A to 9). However, the plurality of fingerprint images are picked up not successively while the fingertip is kept in contact, but each time one fingerprint image is picked up, the same fingertip is re-contacted with the fingerprint inputting region of the fingerprint scanner 2 to pick up a next fingerprint image. This allows a plurality of fingerprint images for the same fingertip to be obtained in different conditions from each other (for example, in different sweating conditions). The number of times by which a fingerprint image is picked up may typically be 2 to 4.

The fingerprint data storage section 20 stores a plurality of fingerprint data produced by the fingerprint data extraction section 10.

The common minutia searching section 30 refers to the plurality of fingerprint data stored in the fingerprint data storage section 20 to detect a correspondence of minutiae between the fingerprint data to search for the same minutiae included commonly in two or more ones of the fingerprint data as common minutiae.

The fingerprint data synthesis section 40 selects one of the common minutiae searched out by the common minutia searching section 30 as a minutia representative of the common minutiae to synthesize the plurality of fingerprint data to produce one synthetic fingerprint data. In this manner, fingerprint synthesis is performed in a unit of an individual minutia from a plurality of fingerprint data and common minutia information. The synthetic finger print data produced by the fingerprint data synthesis section 40 is stored into a storage section not shown. The storage section may be built in the fingerprint data synthesis section 40.

The validation section 50 validates the final synthetic fingerprint data produced by the fingerprint data synthesis section 40, that is, validates, after fingerprint synthesis, whether or not a result of the fingerprint synthesis forms valid fingerprint data.

In order to validate the final synthetic fingerprint data, the validation section 50 confirms, for example, at least one of the following four items with regard to the final synthetic fingerprint data:

(a1) Validity of regions (ranges) of presence of the minutiae in the synthetic fingerprint data;

(a2) Validity of one-sidedness of presence of the minutiae in the synthetic fingerprint data;

(a3) Validity of the relational information between the minutiae in the synthetic fingerprint data; and (a4) Validity of the number of minutiae (whether it is excessively great or excessively small) in the synthetic fingerprint data.

A particular validation scheme by the validation section 50 based on the validity criteria (a1) to (a4) above is hereinafter described with reference to FIGS. 6A to 9.

The validation section 50 numerically evaluates and confirms the four validity criteria given above and determines the validity of the synthetic fingerprint data based on the evaluation values of the validity criteria. Upon such determination, where only one of the four validity criteria is used for the validation, it is discriminated whether or not the evaluation value for the validity criterion falls within a predetermined range. However, where two or more of the four validity criteria are used for validation, it is discriminated whether or not a total value of the evaluation values for the validity criteria falls within a predetermined range.

When the evaluation value (or the total value of such evaluation values) falls within the predetermined range, the validation section 50 discriminates that the synthetic fingerprint data (synthesis result) forms valid fingerprint data, that is, fingerprint synthesis has been performed successfully. Consequently, the validation section 50 outputs the synthetic fingerprint data to the outside or stores the synthetic fingerprint data into a built-in storage section not shown. On the contrary when the evaluation value (or the total value of such evaluation values) comes out of the predetermined range, the validation section 50 discriminates that the synthetic fingerprint data (synthesis result) does not form valid fingerprint data, that is, fingerprint synthesis has been performed but in failure. Consequently, the validation section 50 abandons the synthetic fingerprint data.

Figure 2:
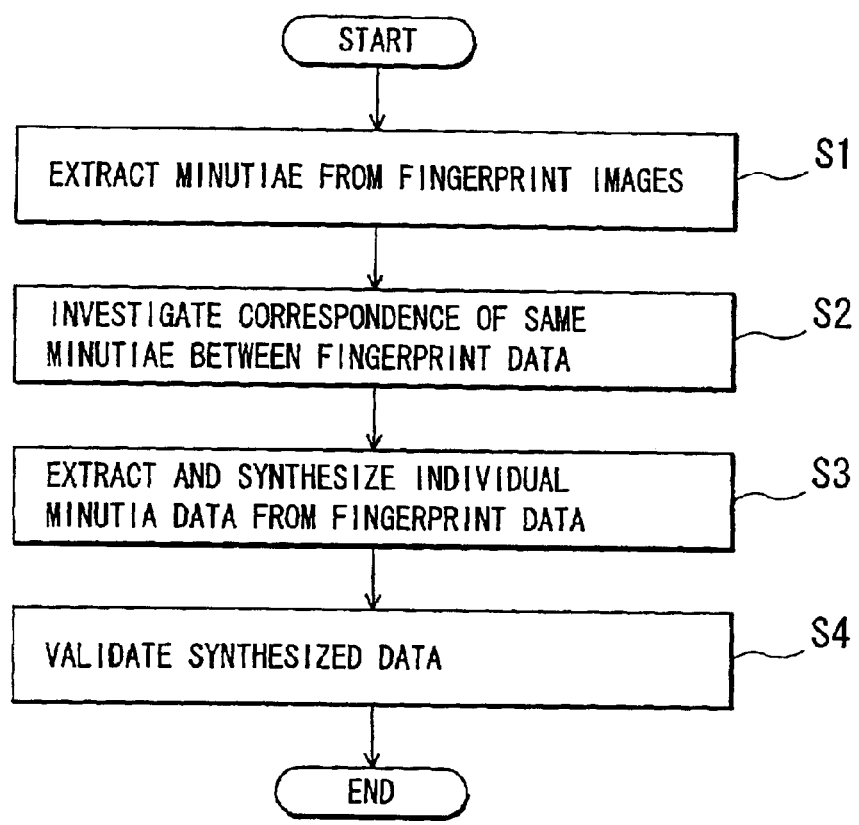
FIG. 2 is a flow chart illustrating a fingerprint data synthesis procedure of the first embodiment.

Now, a fingerprint data synthesis procedure of the first embodiment is described with reference to a flow chart (steps S1 to S4) shown in FIG. 2.

First, a plurality of fingerprint images picked up from the same finger by the fingerprint scanner 2 are inputted to the fingerprint data extraction section 10. The fingerprint data extraction section 10 extracts minutiae (end points, bifurcations), fingerprint ridge orientation, minutia distances and ridge lengths between minutiae as well as relational information including the numbers of ridges between the fingerprint characteristic points from each of the fingerprint images to produce fingerprint data (step S1). The fingerprint data produced for each fingerprint image are stored into the fingerprint data storage section 20.

Then, the common minutia searching section 30 investigates a correspondence of the minutia between the plurality of fingerprint data stored in the fingerprint data storage section 20 (step S2).

It is to be noted that the investigation of the correspondence of the minutia by the common minutia searching section 30 is not so precise as that for fingerprint verification, since the investigation is conducted into the same fingertip, but is performed based on whether or not there is a minutia present at the same or substantially same position with respect to a predetermined reference position (for example, the center of a fingerprint) common to the plurality of fingerprint data. Thus, the investigation involves discrimination of a correspondence of the minutiae depending only upon a positional condition.

Since the plurality of fingerprint data originate from the same fingertip as described above, information regarding the same minutia may naturally be included in two or more fingerprint data.

Therefore, in the fingerprint data synthesis apparatus 1 of the first embodiment, when the common minutia searching section 30 extracts the same minutiae included commonly in two or more ones of the fingerprint data as common minutiae as a result of the investigation, the fingerprint data synthesis section 40 arranges, from the common minutia information obtained by the common minutia searching section 30, the minutia data to produce one synthetic fingerprint data so that the minutiae may not overlap with each other (step S3).

In particular, if the same minutiae which are included commonly in two or more fingerprint data are detected, then the fingerprint data synthesis section 40 selects one of the common minutiae as a minutia representative of the common minutiae and synthesizes the plurality of fingerprint data to produce one synthetic fingerprint data.

It is to be noted that a particular minutia selection scheme by the fingerprint data synthesis section 40 is hereinafter described in connection with second and third embodiments of the present invention.

Depending upon a condition when a fingerprint is picked up, a minutia which is included in a certain one fingerprint data but is not included in the other fingerprint data may be found. In such an instance, if the minutia satisfies requirements for a correct minutia, then the fingerprint data synthesis section 40 produces synthetic fingerprint data which includes information regarding the minutia.

Finally, the validation section 50 validates whether or not the synthesis result (synthetic fingerprint data) by the fingerprint data synthesis section 40 forms valid fingerprint data (step S4). In this instance, the validation section 50 numerically evaluates and confirms at least one of the four validity criteria described hereinabove. Then, if the evaluation value falls within a predetermined range, then the validation section 50 discriminates that the fingerprint synthesis has been performed successfully and utilizes the synthetic fingerprint data. On the contrary if the evaluation value comes outside the predetermined range, then the validation section 50 discriminates that the fingerprint synthesis has been performed but in failure and abandons the synthetic fingerprint data without utilizing them as fingerprint data.

As described hereinabove, a fingerprint image is read by the fingerprint scanner 2 for exclusive use. The fingerprint scanner 2 may be formed in various schemes including a scheme which includes a combination of an image pickup element such as a CCD unit and a special optical system and another scheme which uses a semiconductor chip to read a fingerprint image directly from a fingertip. However, whichever scheme is used, a clear fingerprint image cannot always be picked up. When the fingertip is somewhat sweated or dry or when the fingertip suffers from a callosity or some abrasion, a clear fingerprint image may not be picked up.

When fingerprint data is produced from a fingerprint image on which ridges do not look clearly, the fingerprint data includes many false minutia data, which deteriorates the fingerprint verification performance. Particularly if registration fingerprint data to be registered into the system include many false minutia data, then each time verification is performed, the false minutia data have a bad influence on the verification and deteriorate the verification success ratio significantly or augment FRR. Also when a region in which a fingerprint looks is one-sided such as when only an end portion of a fingertip looks, minutia data sufficient for fingerprint verification cannot be obtained, resulting in deterioration of the verification success ratio.

Thus, it is a conventional practice to pick up a fingerprint image of the same fingertip several times and select one of resulting fingerprint images on which ridges look clearly to produce registration fingerprint data or synthesize a plurality of fingerprint images to produce a fingerprint image, in which the fingerprint looks fully over a wide range, once and then produce registration fingerprint data. Naturally, however, picking up of a fingerprint image of the same fingertip by a plurality of times does not necessarily assure obtaining a fingerprint image on which the fingerprint looks clearly. Meanwhile, synthesis of images may rather destroy the structure of fingerprint ridges, resulting in a drop of the verification performance.

In the present invention, a correct/false minutia is discriminated in a unit of an individual minutia in each of a plurality of fingerprint data, and correct minutiae are selectively synthesized by the fingerprint data synthesis section 40 to produce fingerprint data which includes a reduced number of false minutia data. It is to be noted that discrimination of a correct/false minutia is performed using a reliability value of each minutia which is hereinafter described in connection with the second and third embodiments of the present invention.

In particular, a plurality of fingerprint data of the same fingertip are prepared and synthesized to produce one fingerprint data. Upon such fingerprint synthesis, the fingerprint data synthesis section 40 detects and excludes false minutia data to re-construct the plurality of fingerprint data into synthetic fingerprint data which is composed only of correct minutiae. Thereupon, by synthesizing fingerprint data from different pickup regions of the fingerprint, synthetic fingerprint data including minutiae over a wide range can be produced. False minutiae included in one fingerprint data produced from a plurality of fingerprint data in such a manner as described above are few, and consequently, a high verification performance can be realized. Further, since the fingerprint data includes minutia data over a wide range, a stabilized verification performance can be realized.

Here, a relationship between fingerprint minutia data and a fingerprint verification system is described.

Usually, a fingerprint of a human fingertip includes 30 to 50 minutiae, and the distribution of such minutiae is quite different between different people. If the distributions of minutiae of two fingerprints coincide with each other, then it is discriminated that the two fingerprints are the same as each other. Verification of the distributions of the minutiae is based on comparison of the positions, types (end points/bifurcations) and orientations of the minutiae between two fingerprints. Also the number of ridges present between two different minutiae or the connection pattern of a ridge between two minutiae is sometimes used for the verification to augment the verification performance.

Fingerprint data includes two kinds of data including minutia basic data including positions, types and orientations of minutiae and minutia relational data representative of a relation of each minutia such as the number of ridges present between the minutia and another minutia or a connection pattern of a ridge. Since a fingerprint includes approximately 30 to 50 minutiae, fingerprint data includes approximately 30 to 50 such minutia data (minutia basic data and minutia relational data).

In the fingerprint verification, such minutia data as described above are verified between two fingerprints, and when the number of minutiae which are detected to be coincident exceeds, it is discriminated that the two fingerprints coincide with each other. For example, if two fingerprint data having 30 minutia data are verified with regard to the individual minutia data and 10 minutia data among the 30 minutia data coincide with each other, then it is discriminated that the two fingerprint data originate from the same fingerprint.

In this manner, in the fingerprint verification, coincidence of fingerprints is determined not when all of minutia data included in the two fingerprint data coincide with each other, but normally when some of the minutia data coincide with each other. The reason is that it cannot be considered that all of minutia data included in fingerprint data are correct.

As described hereinabove, fingerprint data in most cases includes wrong minutiae arising from a failure in extraction of minutiae because of an influence of sweat, wrinkles, an injury or dryness. Further, where the position of the fingerprint scanner 2 at which a fingertip is placed is different, fingerprint data of the same finger which originates from different fingerprint pickup regions are obtained, and such two fingerprint data may be extracted from non-overlapped regions. Minutia data included in these two fingerprint data can not be verified.

Where fingerprint data includes many false minutiae or the fingerprint pickup region is one-sided, it is difficult to achieve a higher verification performance.

Accordingly, it is desired to produce registration fingerprint data which includes a few false minutiae and includes minutia data over a wide range. Therefore, the fingerprint data synthesis section 40 synthesizes a plurality of fingerprint data to produce fingerprint data which includes a few number of false minutiae and includes minutiae over a wide range.

Now, the principle of fingerprint data synthesis of the present embodiment is described with reference to FIGS. 3 to 5.

Figure 3:
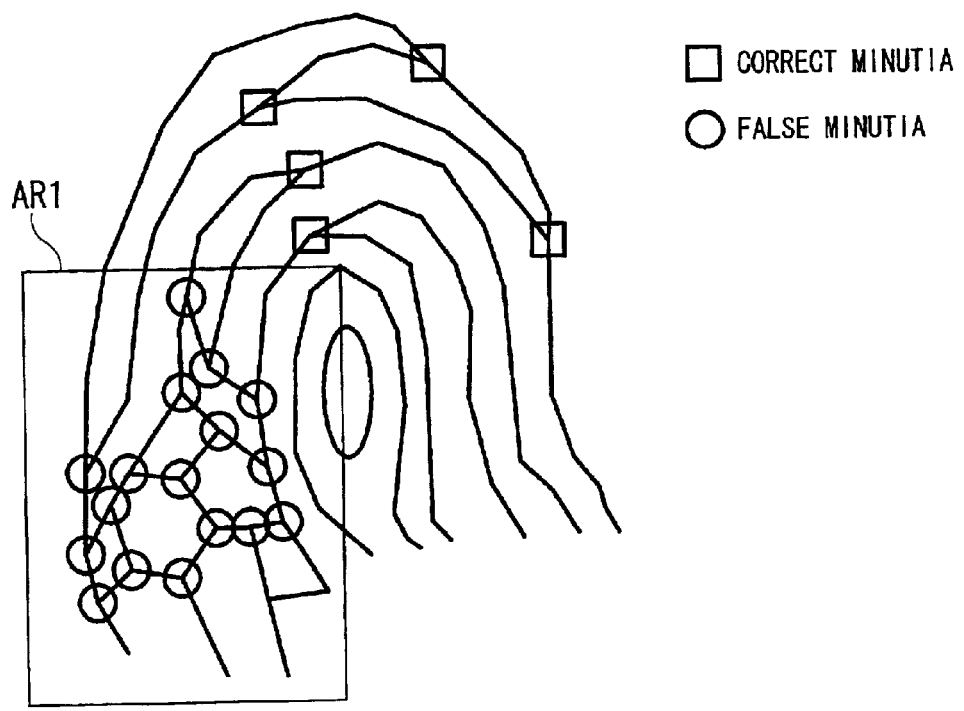
FIGS. 3 to 5 are schematic views illustrating the principle of fingerprint data synthesis of the first embodiment.

An example of a fingerprint image having a partially collapsed ridge structure is shown in FIG. 3. If a large amount of adhesion between ridges is produced, for example, by sweat, then a net-like ridge structure which includes a large number of false minutiae is detected as seen in an area AR1 of FIG. 3. Production of registration fingerprint data which includes such false minutiae apparently disables normal fingerprint verification.

Figure 4:
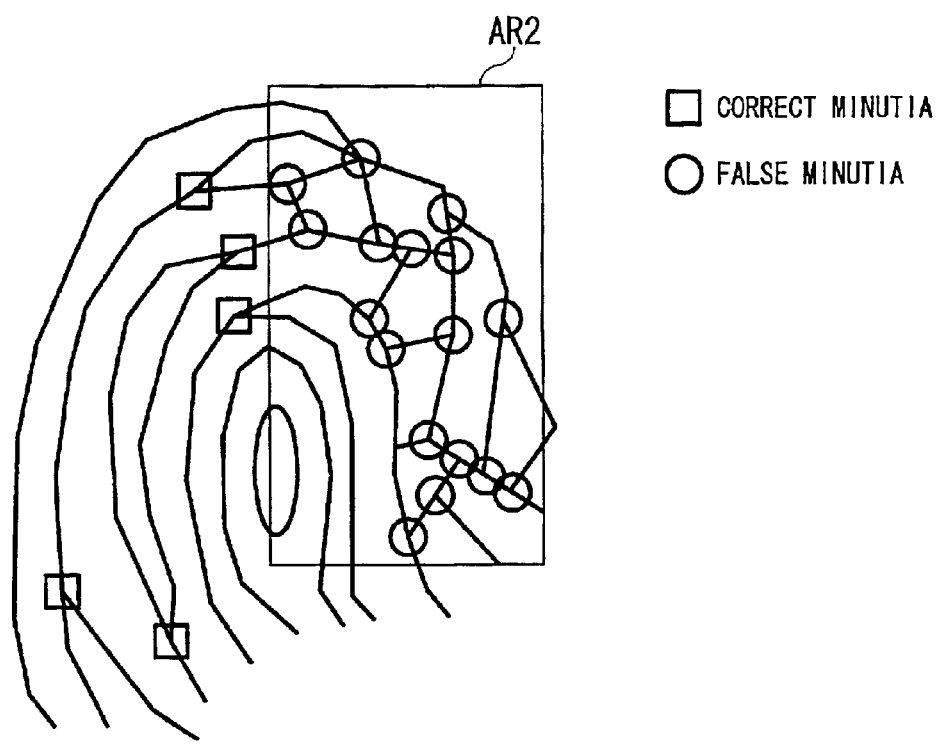
Figure 5:
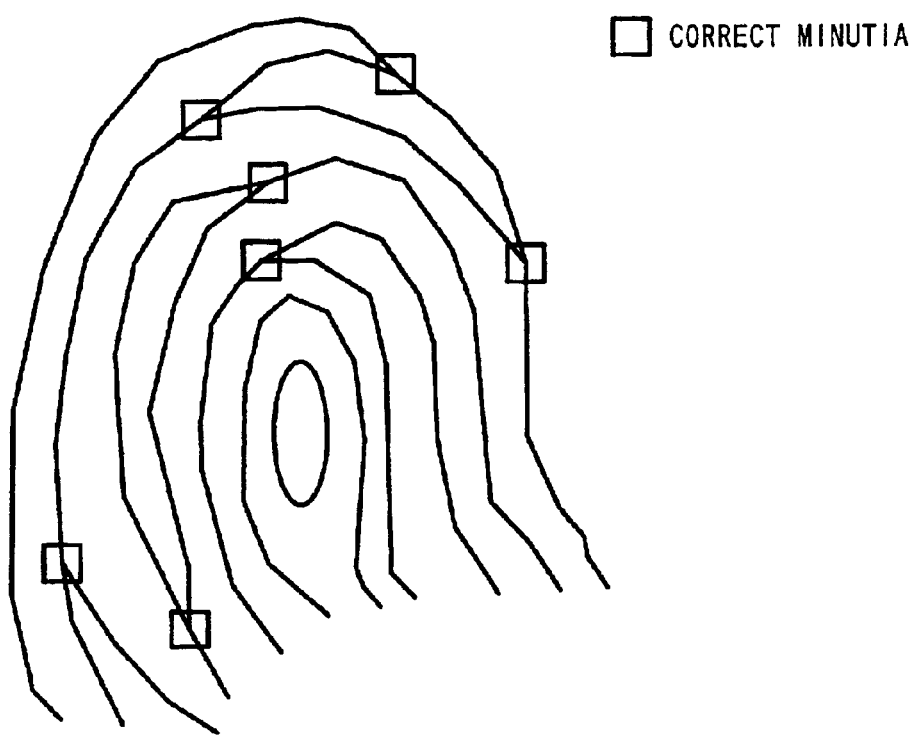

It is assumed that such a fingerprint image as shown, for example, in FIG. 4 is obtained separately as a fingerprint image of the same fingertip. Also the fingerprint image of FIG. 4 includes a partially destroyed ridge structure similarly to the fingerprint image of FIG. 3 and cannot be used for production of correct fingerprint data. However, if a portion of the fingerprint image shown in FIG. 3 at which the ridge structure is extracted correctly and a portion of the fingerprint image shown in FIG. 4 at which the ridge structure is extracted correctly are combined to each other, then such a synthetic fingerprint image which includes only correct minutiae as shown in FIG. 5 can be produced. Further, by synthesizing fingerprint data in a similar manner, fingerprint data which include minutia data over a wide range can be obtained.

In the prior art, in order to synthesize fingerprint data, fingerprint images are synthesized as they are to produce a single fingerprint image first, and then fingerprint data is produced from the single synthesized fingerprint image.

In contrast, according to the present invention, fingerprint images are used to produce fingerprint data first, and then the fingerprint data are synthesized to produce synthetic fingerprint data which includes a few false minutiae data and includes minutia data over a wide range.

Further, in the present invention, it is validated whether or not the synthetic fingerprint data produced in such a manner as described above are valid to secure the reliability as synthetic fingerprint data (registration fingerprint data).

Now, a scheme for validating synthetic fingerprint data in the present embodiment is described with reference to FIGS. 6A, 6B, 7A, 7B, 8, 9 and 34. The figures just mentioned illustrate distribution conditions of minutiae included in synthetic fingerprint data in a fingerprint inputting region 100 of the fingerprint scanner 2, that is, a fingerprint pickup face with which a fingertip is to be contacted.

First, the validity of an existing region (range of presence) of minutiae in synthetic fingerprint data is described with reference to FIGS. 6A and 6B.

Figure 6A:
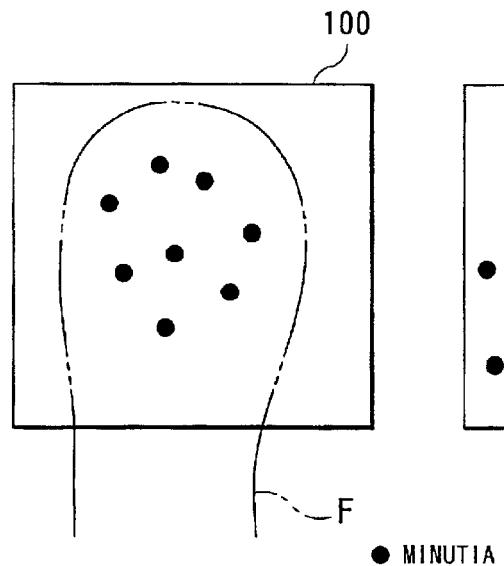
FIGS. 6A, 6B, 7A, 7B, 8 and 9 are schematic views illustrating validation schemes of synthetic fingerprint data in the first embodiment.

If all minutiae are present within a region F of the fingerprint inputting region 100 in which a fingertip is usually pressed as seen in FIG. 6A, then it can be determined that the synthesis result is valid.

Figure 6B:
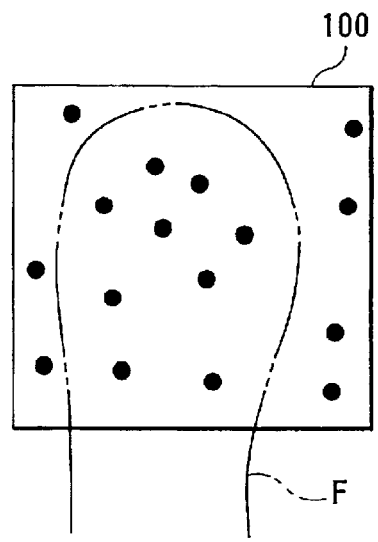

However, if some minutia or minutiae are present also outside the region F as seen in FIG. 6B, it can be determined that the fingerprint synthesis has been performed but in failure with a high degree of probability.

As described hereinabove, fingerprint synthesis makes it possible to collect minutiae of areas over a wide range to produce fingerprint data. However, in this instance, if the synthesis result includes some minutia or minutia which are present in a range which is not realistic, then the fingerprint synthesis has been performed in failure with a high degree of probability.

Therefore, if an evaluation value which decreases as the number of minutiae which are present, for example, in the region F described above is defined and used for calculation, then it is possible to exclude such synthetic fingerprint data produced by the fingerprint synthesis which has been performed in failure a high degree of possibility as seen in FIG. 6B.

For example, if the ratio between the number of minutiae included in the region F described above and the number of all of minutiae included in the synthesis result is calculated as an evaluation value, then the evaluation value of the synthetic fingerprint data shown in FIG. 6A is "⅜=1" while the evaluation value of the synthetic fingerprint data shown in FIG. 6B is "9/16=0.5625". Accordingly, if the validation section 50 sets the range of, for example, 0.9 or more as the predetermined range described above, then the evaluation value of the synthetic fingerprint data shown in FIG. 6B is outside the range, and it is discriminated that the synthetic fingerprint data has been obtained by the failed fingerprint synthesis.

Meanwhile, if the increasing ratio Ns/Na of the minutia number within a region of synthetic fingerprint data (synthesis region) exceeds a predetermined value, then it can be discriminated that the fingerprint synthesis has been performed in failure with a high degree of possibility, but otherwise if the increasing ratio Ns/Na remains within the predetermined value, then it can be discriminated that the result of the synthesis is reasonable. It is to be noted that Ns above is the number of minutiae in the region of synthetic fingerprint data (synthesis region), and Na is an average value of the numbers of minutiae in a plurality of fingerprint data prior to the synthesis in a region corresponding to the synthesis region.

The validity is highest when all minutiae in the synthesis region exist commonly in the plurality of fingerprint data. In such a state as just described, Ns=Na is satisfied, and the increasing ratio Ns/Na mentioned above is 1. However, as the number of minutiae which exist commonly in the plurality of fingerprint data decreases, or in other words, as the validity of the synthesis result decreases, the increasing ratio Ns/Na increases.

A particular example of a validation method in which such an increasing ratio Ns/Na as described above is used is described with reference to FIGS. 34A to 34D. FIGS. 34A to 34C illustrate fingerprint data FA, FB and FC, respectively, and FIG. 34D illustrates synthetic fingerprint data (synthesis region F') produced by synthesis of the three fingerprint data FA, FB and FC.

The minutia number Ns in the synthesis region F' shown in FIG. 34D is 12. Of the 12 minutiae, four minutiae exist commonly in the fingerprint data FA and FB; five minutiae exist commonly in the fingerprint data FB and FC; two minutiae exist only in the fingerprint data FA; and one minutia is present only in the fingerprint data FC. In other words, the region of the fingerprint data FA corresponding to the synthesis region F' includes six minutiae as seen in FIG. 34A; the region of the fingerprint data FB corresponding to the synthesis region F' includes nine minutiae as seen in FIG. 34B; and the region of the fingerprint data FC corresponding to the synthesis region F' includes six minutiae as seen in FIG. 34C.

However, the fingerprint data FC and FA include no common minutia therein. Therefore, it is considered that either the fingerprint FC and FA originate from different fingerprint images or the fingerprint synthesis of the fingerprint data FA to FC has been performed but in failure. In either case, the validity of the synthetic fingerprint data F' is very low.

In the example shown in FIGS. 34A to 34D, Ns is 12 and Na is (6+9 +6)/3=7, and therefore, the increasing ratio Ns/Na is NS/Na=12/7≈1.7. Accordingly, if, for example, 1.2 is set in advance as the predetermined value mentioned hereinabove, then it is discriminated that the synthetic fingerprint data F' illustrated in FIG. 34D has been obtained as a result of failure in fingerprint synthesis.

The validity of one-sidedness of existence of minutiae in synthetic fingerprint data is described with reference to FIGS. 7A, 7B and 8.

Figure 7A:
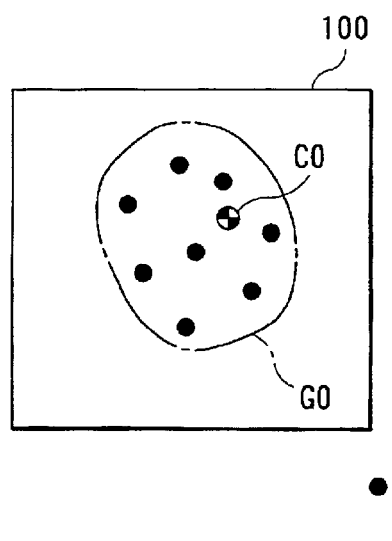

If all minutiae exist as one group G0 around the fingerprint center C0 in the fingerprint inputting region 100 as seen in FIG. 7A, then it can be discriminated that the synthesis result is valid. It is to be noted that, for example, a point at which the greatest curvature is exhibited by a ridge is selected as the fingerprint center C0.

Figure 7B:
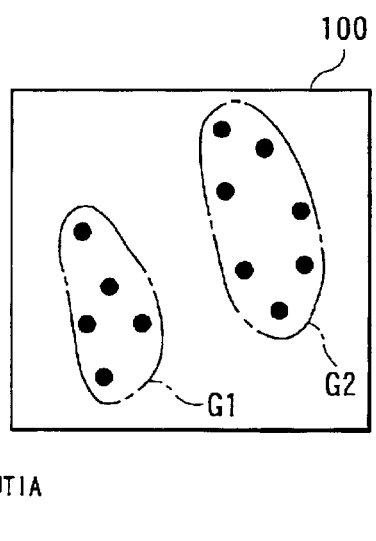
Figure 8:
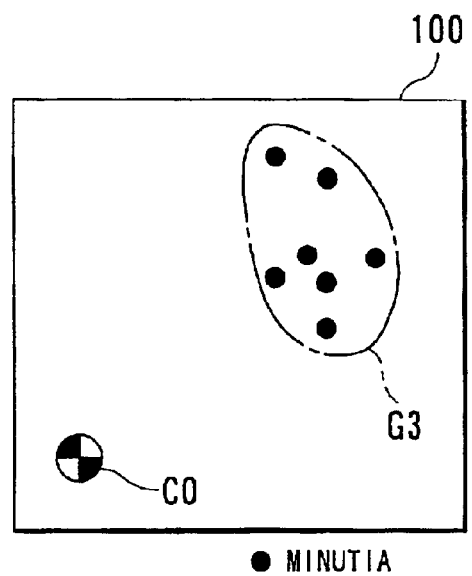

However, where minutiae exist in two fully different or independent groups G1 and G2 as seen in FIG. 7B or where minutiae exist one-sidedly as one group G3 at a position spaced from the fingerprint center C0 as seen in FIG. 8, it can be discriminated that the fingerprint synthesis has been performed but in failure with a high degree of probability.

The following method is used for grouping of minutiae. In particular, each minutia is virtually connected to another minutia nearest to the minutia. However, any two minutiae are not connected to each other if they are spaced away from each other by a distance greater than a predetermined value. The same label is applied to the thus connected minutiae whereas different labels are applied to those minutiae which are spaced away from each other by more than the predetermined distance. The minutiae to which the same label is applied in this manner are regarded as a group.

Therefore, if an evaluation value is defined and calculated so that it has a low value where minutiae are present in groups or where minutiae are spaced away from the fingerprint center, then such synthetic fingerprint data which has been obtained by fingerprint synthesis failed with a high degree of possibility as seen in FIG. 7B or 8 can be excluded.

Figure 9:
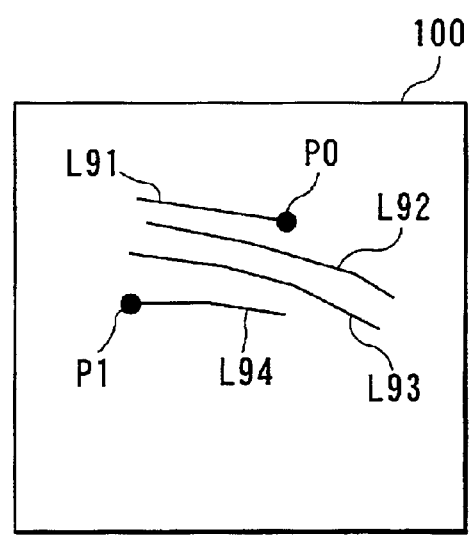

Now, the validity of relational information between minutiae in synthetic fingerprint data is described with reference to FIG. 9. The synthetic fingerprint data illustrated in FIG. 9 includes two end points as minutiae P0 and P1. The minutia P0 is an end point of a ridge L91 and the minutia P1 is an end point of another ridge L94. Further, the synthetic fingerprint data illustrated in FIG. 9 includes two ridges L92 and L93 between the ridges L91 and L94.

In this instance, if the relational information of the minutia P0 and the relational information of the minutia P1 are inconsistent, then it can be discriminated that the fingerprint synthesis has been performed in failure with a high degree of probability. Such discrimination is made, for example, when the relational information of the minutia P0 represents that "the number of ridges between the minutiae P1 and P0 is 2" while the relational information of the minutia P1 represents that "the number of ridges between the minutiae P1 and P0 is four" or when the relational information of the minutia P0 represents that "the minutia P1 is present on the third next (lower) ridge" while the relational information of the minutia P1 represents that "the minutia P0 is present on the next (upper) ridge".

Therefore, if an evaluation value is designated and used for calculation so that it decreases as the number of occurrences of such inconsistency as described above increases, then synthetic fingerprint data which includes inconsistency in relational information thereof and has been obtained by the fingerprint synthesis failed with a high degree of possibility can be excluded.

Finally, the validity of the number of minutiae (whether it is excessively great or small in number) in synthetic fingerprint data is described. Also where the number of minutiae included in synthetic fingerprint data is excessively great or excessively small, it can be discriminated that the fingerprint synthesis has been performed in failure with a high degree of reliability. For example, if an evaluation value is defined and used for calculation so that it has a lower value where the number of minutiae is smaller than 10 or greater than 50, synthetic fingerprint data which includes an excessively great number or an excessively smaller number of minutiae and which has been obtained by fingerprint synthesis failed with a high degree of possibility can be excluded.

In this manner, with the fingerprint data synthesis apparatus 1 of the first embodiment of the present invention, minutiae are extracted from each of a plurality of fingerprint images and the minutiae extracted from the fingerprint images are synthesized to produce one synthetic fingerprint data. Consequently, the synthetic fingerprint data can be produced using the minutiae having high reliability. Further, since the fingerprint images need not be synthesized in a state as they are with each other, such a bad influence as destruction of a ridge structure can be eliminated.

Accordingly, when using the synthetic fingerprint data as registered fingerprint data, registration fingerprint data which includes correct minutiae (minutiae having high reliability) extracted accurately from fingerprint images can be produced, and a high verification performance can be realized with a system which confirms an individual based on a fingerprint.

Further, since minutiae over a wide range can be extracted accurately from a plurality of fingerprint images picked up from different regions of a fingerprint to produce registration fingerprint data, a stable verification performance can be realized on the system.

Furthermore, since the validation section 50 validates whether or not the synthetic fingerprint data is valid, only the fingerprint data whose synthesis result is valid can be used as registration fingerprint data, and fingerprint authentication is performed using the registration fingerprint data which is high in reliability. Consequently, a higher verification performance can be realized.

In this instance, since the validation section 50 confirms the validity of minutiae included in the synthetic fingerprint data with regard to the range of existence, one-sidedness, relational information or the number to validate the synthetic fingerprint data, synthetic fingerprint data obtained by fingerprint synthesis which has been performed in failure with a high degree of probability can be excluded with certainty taking various synthesis conditions into consideration. Consequently, fingerprint authentication can be achieved using registration fingerprint data of higher reliability, and the verification performance can be further augmented.

[2] Second Embodiment

As described above in connection with the first embodiment, upon synthesis of two or more fingerprint data by the fingerprint data synthesis section 40, it is desired that correct minutiae and false minutiae can be identified with certainty. Therefore, in the second and third embodiments, for each of minutiae extracted by the fingerprint data extraction section 10, a minutia reliability value representative of a degree (degree of repeatability) with which the minutia is a correct minutia is defined. Then, minutia reliability values of minutiae are determined, and synthesis of the minutiae is performed in accordance with the values.

Figure 10:
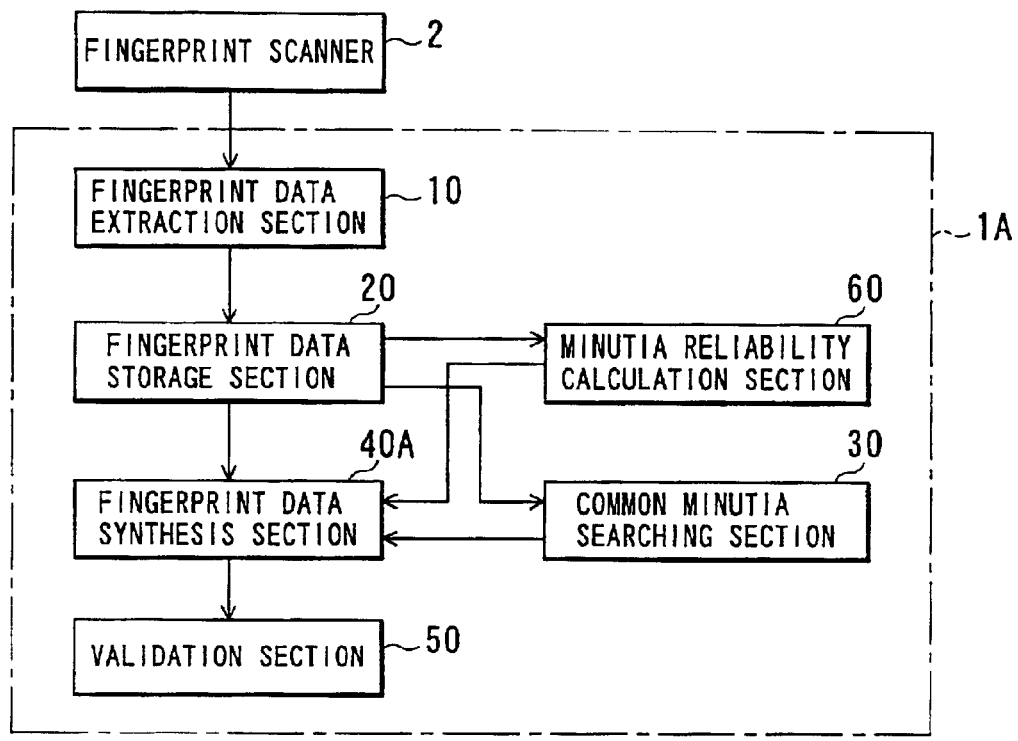
FIG. 10 is a block diagram showing a functional construction of a fingerprint data synthesis apparatus as a second embodiment.

FIG. 10 is a block diagram showing a functional construction of a fingerprint data synthesis apparatus as a second embodiment of the present invention. The fingerprint data synthesis apparatus 1A of the second embodiment shown in FIG. 10 includes a fingerprint data extraction section 10, a fingerprint data storage section 20, a common minutia searching section 30 and a validation section 50 which are similar to those of the first embodiment, and further includes a minutia reliability calculation section 60 and a fingerprint data synthesis section 40A. It is to be noted that description of such common components as those described hereinabove is omitted herein to avoid redundancy.

Also the fingerprint data synthesis apparatus 1A of the present embodiment is implemented from a computer system such as a personal computer which includes a CPU, a RAM, a ROM and other elements connected to each other by a bus line similarly to the fingerprint data synthesis apparatus 1 of the first embodiment.

Also functions of the fingerprint data synthesis section 40A and the minutia reliability calculation section 60 of the fingerprint data synthesis apparatus 1A are implemented by executing an application program stored on a recording medium by means of the CPU and so forth similarly to those of the fingerprint data extraction section 10, common minutia searching section 30, fingerprint data synthesis section 40 and validation section 50 of the first embodiment described hereinabove.

Also the fingerprint data synthesis apparatus 1A shown in FIG. 10 is used to synthesize a plurality of fingerprint images from the fingerprint scanner 2 to produce fingerprint data for verification (registration fingerprint data) to be used actually when authentication of an individual is performed by a system which identifies an individual using a fingerprint.

In the fingerprint data synthesis apparatus 1A of the second embodiment, however, for each of minutiae extracted by the fingerprint data extraction section 10, a minutia reliability value representative of a degree with which the minutia is a correct minutia, that is, a degree of repeatability. Thus, the fingerprint data synthesis apparatus 1A includes the minutia reliability calculation section 60 for determining the minutia reliability value as a new component. Further, the fingerprint data synthesis apparatus 1A includes the fingerprint data synthesis section 40A for synthesizing the minutia data in accordance with the minutia reliability values in place of the fingerprint data synthesis section 40 of the first embodiment.

In particular, the minutia reliability calculation section 60 calculates a reliability value of each of minutiae of a plurality of fingerprint data stored in the fingerprint data storage section 20. More particularly, the minutia reliability calculation section 60 acquires at least one of data of, for example, the following items (b1) to (b4) from fingerprint data and calculates a minutia reliability value based on the data:

(b1) The difference between the direction of each minutia and the direction of the ridge;

(b2) The ridge length or distance from each minutia to another neighboring minutia;

(b3) The distance from each minutia to a neighboring ridge; and (b4) The positional relationship between each minutia and another neighboring minutia (generation pattern of other minutiae around each minutia).

It is to be noted that a particular scheme of calculating a minutia reliability value by the minutia reliability calculation section 60 based on data of the items (b1) to (b4) above is hereinafter described with reference to FIGS. 12A to 16C.

When the fingerprint data synthesis section 40A selects one of common minutiae searched out by the common minutia searching section 30, it refers to the reliability value calculated for each minutia by the minutia reliability calculation section 60 to preferentially select and use those minutiae which have comparatively high reliability values to produce synthetic fingerprint data.

Figure 11:
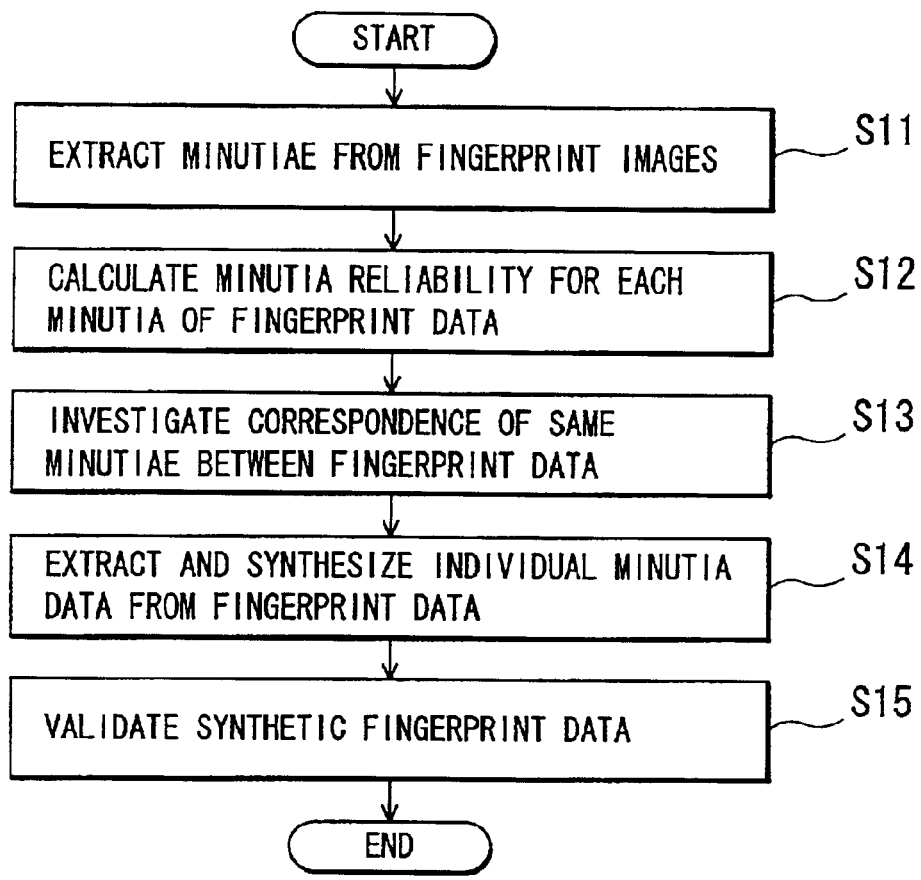
FIG. 11 is a flowchart illustrating a fingerprint data synthesis procedure of the second embodiment.

Now, a fingerprint data synthesis procedure of the second embodiment is described below with reference to a flow-chart (steps S11 to S15) shown in FIG. 11.

First, a plurality of fingerprint images picked up from the same finger by the fingerprint scanner 2 are inputted to the fingerprint data extraction section 10. The fingerprint data extraction section 10 extracts minutiae (end points, bifurcations), fingerprint ridge directions, minutia distances and ridge lengths between minutiae as well as relational information including the numbers of ridges between the minutiae from each of the fingerprint images to produce fingerprint data (step S11). The fingerprint data produced for each fingerprint image are stored into the fingerprint data storage section 20.

Then, the minutia reliability calculation section 60 calculates the reliability value of each of the minutiae in all of the fingerprint data stored in the fingerprint data storage section 20 based on the data of at least one of the items (b1) to (b4) described hereinabove (step S12)

Further, similarly as in step S2 in the first embodiment, the common minutia searching section 30 investigates a correspondence of the minutiae between the plurality of fingerprint data stored in the fingerprint data storage section 20 (step S13).

When the common minutia searching section 30 investigates and extracts the same minutiae included commonly in two or more of the fingerprint data as common minutiae, in the fingerprint data synthesis apparatus 1A of the second embodiment, the fingerprint data synthesis section 40A arranges the minutia data, based on the common minutia information obtained by the common minutia searching section 30 (or the center of each fingerprint) and the reliability values calculated individually for the minutiae by the minutia reliability calculation section 60, so that the minutiae may not overlap with each other to produce one synthetic fingerprint data (step S14). In short, those of the common minutiae searched out by the common minutia searching section 30 which have comparatively high reliability values are selected preferentially to produce synthetic fingerprint data.

It is to be noted that, depending upon the pickup position of a fingerprint, a minutia which is included only in one certain fingerprint data but is not included in any other fingerprint data may sometimes be detected. In this instance, if the minutia satisfies conditions for a correct minutia, then also the fingerprint data synthesis section 40A produces synthetic fingerprint data in which information regarding the minutia is included similarly as in the first embodiment.

Finally, the validation section 50 validates whether or not the synthesis result (synthetic fingerprint data) by the fingerprint data synthesis section 40A forms valid fingerprint data similarly as in the first embodiment (step S15).

Here, a scheme for calculating a minutia reliability value in the second embodiment is described with reference to FIGS. 12A to 16C.

FIGS. 12A and 12B illustrate definitions of the orientation of a minutia in the present embodiment, and FIG. 13 illustrates a scheme for calculating a minutia reliability value based on a difference between the orientation of each minutia and the orientation of the ridge.

First, the definitions of the orientations of an end point and a bifurcation are described with reference to FIGS. 12A to 12C, respectively. Here, it is assumed that the flowing directions of the entire ridges (ridge orientations) are the direction indicated by an arrow mark D1 (rightward direction in FIGS. 12A and 12B).

Where a ridge L2 having an end point as a minutia p1 is present between two ridges L1 and L3 as seen in FIG. 12A, it is defined that the orientation of the minutia p1 is the orientation in which the ridge L2 extends from the minutia p1, that is, the orientation indicated by an arrow mark d1.

Meanwhile, where a ridge L4 is bifurcated at a minutia or bifurcation p2 into two ridges L41 and L42 as seen in FIG. 12B, it is defined that the orientation of the minutia p2 is an orientation in which a virtual line extends from the minutia p2 between the two ridges L41 and L42, that is, the orientation indicated by an arrow mark d2.

The definition of the direction of a bifurcation is described more particularly with reference to FIG. 12C. As seen in FIG. 12C, points on ridges L41, L42 and L4 spaced by an equal ridge line distance from a bifurcation p2 are represented by a, b and c, respectively. The vectors from the minutia p2 to the points a, b and c are represented by Va, Vb and Vc, respectively. Those two of the vectors Va, Vb and Vc which exhibit the smallest difference in direction are extracted, and an average of the two vectors is determined. Thus, the direction of the vector of a result of the averaging is defined as a direction of the bifurcation p2. In particular, in FIG. 12C, the direction of the vector Vd which is an average of the vectors Va and Vb, that is, (Va+Vb)/2, is determined as the direction of the bifurcation p2. The vector Vd in FIG. 12C is the vector d2 in FIG. 12B.

Where the orientation of a minutia is defined as illustrated in FIG. 12A or 12B, the orientation of the minutia and the ridge orientation are the basically same orientations (substantially parallel to each other).

However, if a large number of false minutiae appear as a result of, for example, failure in analysis of a ridge structure or detection of a ridge structure as a mesh-like structure (refer to the region AR1 of FIG. 2 and the region AR2 of FIG. 3), then the orientation of a minutia and the ridge orientation do not coincide with each other.

For example, where a ridge structure is detected as a mesh-like structure as seen in FIG. 13, the orientations of a plurality of minutiae (all being bifurcations) p11 to p13 and p21 to p23 are such as indicated by arrow marks d11 to d13 and d21 to d23, respectively. Neither of the orientations d11 to d13 and d21 to d23 is parallel to the ridge directions D1 at all, unlike the example shown in FIG. 12B.

It is to be noted that reference characters L6 to L8 and L71 to L76 in FIG. 13 denote each a ridge, and the ridges L71 to L76 among them exhibit mesh-like structures produced by bifurcation between the ridges L7 and L8.

In short, when the orientation of a noticed minutia and the orientation in which the ridge flows are compared with each other, it can be determined that, as the difference between the orientations increases, the reliability of the noticed minutia decreases and the possibility that the noticed minutia may be a false minutia increases.

Therefore, the minutia reliability is defined so that it may have a lower value as the difference between the orientation of a noticed minutia (unit vector) and the orientation in which the ridge flows (unit vector) increases as given by, for example, the expression (1) given below. According to the definition, the reliability values of the minutiae p11 to p13 and p21 to p23 which are false minutiae with a high degree of possibility as seen in FIG. 13 are set low thereby to make lower the order numbers in accordance with which the minutiae are selected by the fingerprint data synthesis section 40A.

$$[\text{minutia reliability}] = k^* |V1 \cdot V2| \tag{1}$$

where $|x|$ is the absolute value of x, k is a positive constant of proportion, V1 is a unit vector representative of the orientation of the noticed minutia, V2 is a unit vector representative of the orientation in which the ridge flows, that is, a ridge orientation, and $V1 \cdot V2$ is an inner product between the unit vectors V1 and V2. When the orientation of the noticed minutia is parallel to the flow of the ridge (V1=V2, V1=−V2), the minutia reliability defined by the expression (1) exhibits its highest value k. When the orientation of the noticed minutia is orthogonal to the flow of the ridge, the minutia reliability defined by the expression (1) exhibits its lowest value 0.

Figure 14:
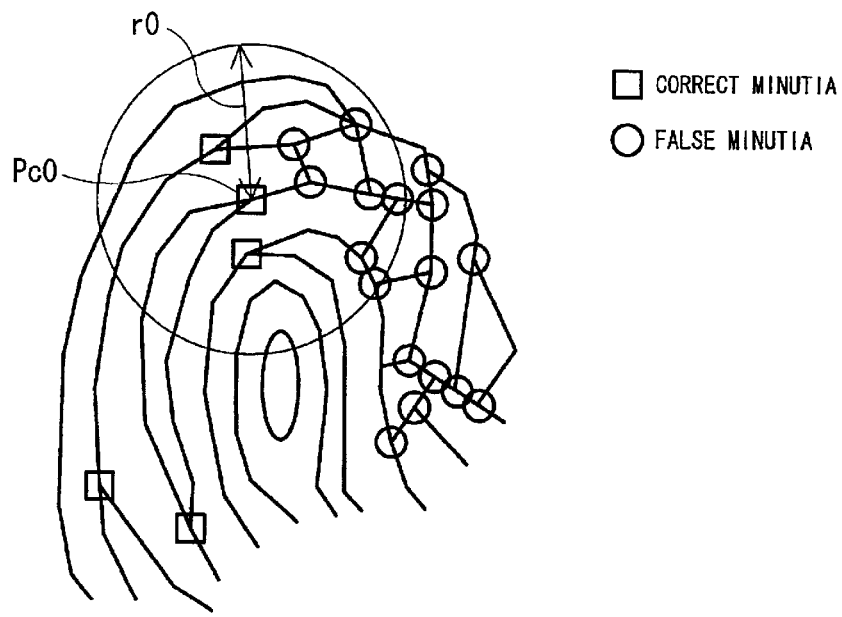

FIG. 14 illustrates a scheme for calculating the minutia reliability based on the ridge length or distance from each minutia to another neighboring minutia.

It does not occur with an ordinary fingerprint that a large number of minutiae appear in a small region. Where the number of minutiae each of which is spaced but by a small distance from another minutia is great, the minutiae have low reliability values, and it can be determined that they are wrong minutiae with high possibility.

Therefore, an index value representative of whether or not a large number of such minutiae appear in a small region can be used for the minutia reliability. For example, by defining the minutia reliability as given by the expression (2) below, the reliability value of a minutia around which a great number of minutiae appear in a small region are set low thereby to make lower the order numbers with which the minutiae are selected by the fingerprint data synthesis section 40A.

$$[\text{minutia reliability}] = -k * N1/N2 \quad (2)$$

where k is a constant of proportion, N1 is the number of those minutiae present within a region of a predetermined radius from the noticed minutia which are each spaced by a distance from another neighboring minutia which is smaller than a predetermined distance value, and N2 is a total number of those minutiae which are within the region of the predetermined radius from the noticed minutia.

For example, in FIG. 14, the total number N2 of the minutiae which are within a region of the predetermined radius r0 from the noticed minutia Pc0 is 10, and of the 10 minutiae, those minutiae from each of which the distance to another neighboring minutia is smaller than the predetermined value are those represented as wrong minutiae and the number N1 of such minutiae is 7. Accordingly, the minutia reliability value according to the expression (2) is $-k*(7/10)=-0.7*k$.

It is to be noted that, while, in the example described above, the number N1 of minutiae is determined based on the distance between a noticed minutia and another minutia, it may otherwise be determined based on a ridge length from a noticed minutia to another minutia on the same ridge.

Figure 15A:
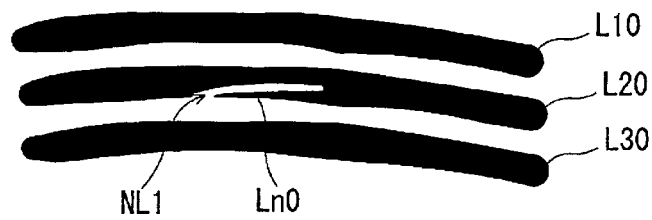
FIGS. 15A, 15B and 16A to 16C are schematic views illustrating calculation schemes of a minutia reliability value in the second embodiment.
Figure 15B:
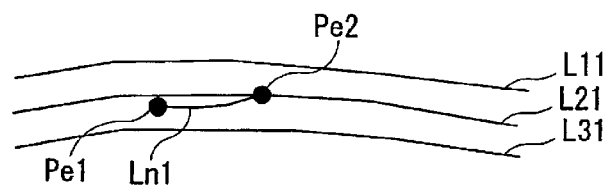

FIGS. 15A and 15B illustrate different schemes for calculating the minutia reliability based on the distance from each minutia to a neighboring ridge.

If a ridge image of a fingerprint image suffers from an elongated crack by some cause, then a false minutia appears.

For example, while FIG. 15A shows three ridge images L10, L20 and L30, an elongated whisker-like line Ln0 appears on the central ridge image L20 because an elongated crack NL1 is produced there.

If ridge structure analysis and minutia extraction are performed for the fingerprint image described, then, for example, three ridges L11, L21 and L31 corresponding to the three ridge images L10, L20 and L30 are extracted and also a ridge Ln1 corresponding to the whisker-like line Ln0 is extracted as seen in FIG. 15B. One end of the ridge Ln1 is an end point Pe1 and the other end of the ridge Ln1 is a bifurcation Pe2, and both of the end point Pe1 and the bifurcation Pe2 are false minutiae. In short, the false minutiae are produced from the crack NL1.

The end point Pe1 as a false minutia can be recognized by checking the distance to a neighboring ridge. In particular, when the distance from the noticed minutia to a neighboring ridge is smaller than the distance between ridges which can be seen over the entire fingerprint, the reliability of the noticed minutia is low, and it can be determined that the possibility that the noticed minutia may be a false minutia is high.

Therefore, the minutia reliability is defined as a value which increases in proportion to the shortest distance from the noticed minutia to a neighboring ridge as given, for example, by the expression (3) below. According to the definition, the reliability of a minutia which is produced by a crack or the like of a fingerprint image is set low thereby to make lower the order number with which the minutia is selected by the fingerprint data synthesis section 40A.

$$[\text{minutia reliability}] = k*D \quad (3)$$

where k is a constant of proportion, and D is the shortest distance from the noticed minutia to a neighboring ridge.

For example, where the minutia (end point) pe1 in FIG. 15B is set as a noticed minutia, the shortest distance from the minutia Pe1 to the ridge L21 is determined as D, and the minutia reliability is calculated based on the shortest distance D. The shortest distance D is apparently smaller than the distances between the ridges L11, L21 and L31, and the reliability of the minutia Pe1 is low. Accordingly, the order number with which the minutia Pe is selected by the fingerprint data synthesis section 40A is low.

Figure 16A:
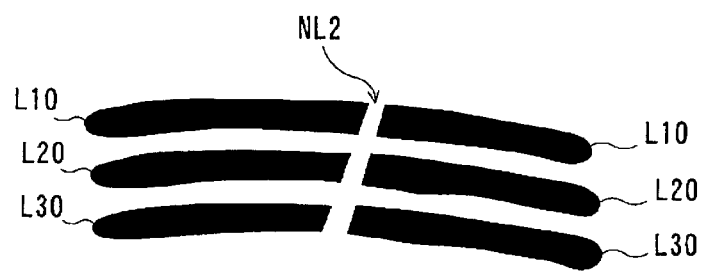
Figure 16B:
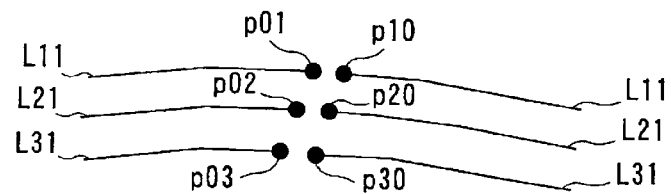
Figure 16C:
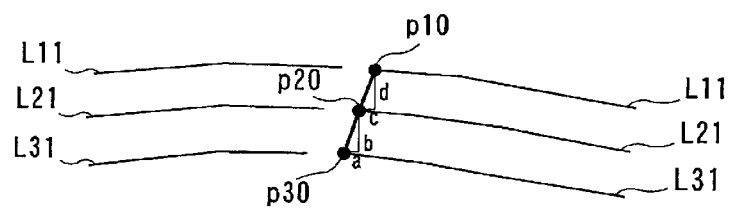

FIGS. 16A to 16C illustrate different schemes for calculating the minutia reliability based on the positional relationship between each minutia and a neighboring minutia, that is, a generation pattern of other minutiae in the proximity of each minutia.

If a finger suffers from an injury such as a cut, then a crack appears on ridges of the fingerprint of the finger. Accordingly, for example, as seen in FIG. 16A, ridges L10, L20 and L30 are divided by the crack NL2.

If minutiae are extracted from such a fingerprint image as just described, then end points p01 and p10 appear on the ridge L11 and end points p02 and p20 appear on the ridge L21, and end points p03 and p30 appear on the ridge L31 as seen in FIG. 16B. Then, the end points p01, p02 and p03 appear substantially on a line, and the end points p10, p20 and p30 appear substantially on another line. In this manner, false minutiae originating from an injury or a wrinkle appear in an aligned relationship.

Accordingly, where a noticed minutia is aligned with other minutiae, the reliability of the noticed minutia is low, and it can be determined that the noticed minutia is a false minutia with high possibility.

Therefore, the minutia reliability, that is, the reliability of the noticed minutia, is defined so that it has a low value when the inclinations of straight lines interconnecting a noticed minutia and two other neighboring minutiae are equal or substantially equal to each other.

In short, the minutia reliability is set as a value which increases in proportion to an absolute value of the difference between inclinations of straight lines interconnecting a noticed minutia and two other minutiae, for example, as given by the following expression (4):

$$[\text{minutia reliability}] = k*|b/a - d/c| \quad (4)$$

where k is a constant of proportion, and as seen in FIG. 16C, b/a is the inclination of the straight line interconnecting the noticed minutia p20 and another minutia p30, and d/c is the inclination of the straight line interconnecting the noticed minutia p20 and a further minutia p10.

Consequently, the reliability values of such minutiae p01 to p03 and p10 to p30 as seen in FIG. 16C are set low thereby to make lower the order numbers with which the minutiae are selected by the fingerprint data synthesis section 40A.

It is to be noted that the minutia reliability calculation section 60 may use only one of the four expressions (1) to (4) given hereinabove to calculate a minutia reliability value or may use two or more of the expressions (1) to (4) to calculate minutia reliability values and calculate a total value of the thus calculated reliability values as a final minutia reliability value.

In this manner, with the fingerprint data synthesis apparatus 1A of the second embodiment of the present invention, similar effects and advantages to those of the first embodiment can be achieved. Further, since reliability values of individual minutiae are calculated by the minutia reliability calculation section 60 and a minutia which represents common minutiae is selected based on the reliability values by the fingerprint data synthesis section 40A, minutiae having high reliability can be selected readily as minutiae to be used to form synthetic fingerprint data.

Accordingly, since false minutiae (minutiae whose reliability is low) are excluded and synthetic fingerprint data is re-constructed only from correct minutiae (minutiae whose reliability is high), synthetic fingerprint data having high reliability can be produced readily. Consequently, a system which identifies an individual based on a fingerprint can realize a higher verification performance.

[3] Third Embodiment

Figure 17:
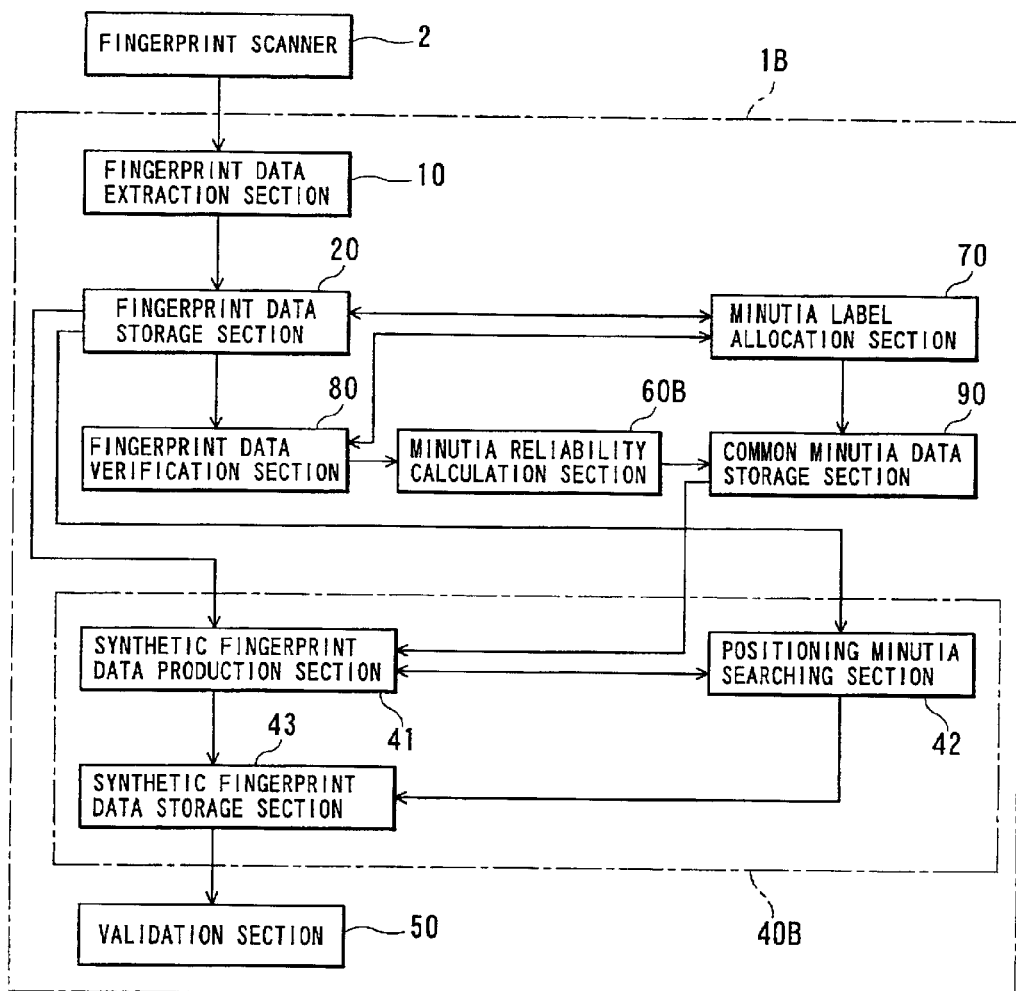
FIG. 17 is a block diagram showing a functional construction of a fingerprint data synthesis apparatus as a third embodiment.

FIG. 17 is a block diagram showing a functional construction of a fingerprint data synthesis apparatus as a third embodiment of the present invention. The fingerprint data synthesis apparatus 1B of the third embodiment shown in FIG. 17 includes a fingerprint data extraction section 10, a fingerprint data storage section 20 and a validation section 50 which are similar to those of the first embodiment, and further includes a minutia label allocation section 70, a fingerprint data verification section 80, a minutia reliability calculation section 60B, a common minutia data storage section 90 and a fingerprint data synthesis section 40B. It is to be noted description of such common components as those described hereinabove is omitted herein to avoid redundancy.

Also the fingerprint data synthesis apparatus 1B of the present embodiment is implemented from a computer system such as a personal computer which includes a CPU, a RAM, a ROM and other elements connected to each other by a bus line similarly to the fingerprint data synthesis apparatus 1 of the first embodiment.

Also functions of the fingerprint data synthesis section 40B, minutia reliability calculation section 60B minutia label allocation section 70 and fingerprint data verification section 80 of the fingerprint data synthesis apparatus 1B are implemented by executing an application program stored on a recording medium by means of the CPU and so forth similarly to those of the fingerprint data extraction section 10, common minutia searching section 30, fingerprint data synthes is section 40 and validation section 50 of the first embodiment described hereinabove. Further, the RAM or/and the ROM provide a function as the common minutia data storage section 90.

Also the fingerprint data synthesis apparatus 1B of the third embodiment shown in FIG. 17 is used to synthesize a plurality of fingerprint images from the fingerprint scanner 2 to produce fingerprint data for verification (registration fingerprint data) to be used actually when authentication of an individual is performed by a system which identifies an individual using a fingerprint.

The fingerprint data synthesis apparatus 1B of the third embodiment, however, additionally includes the fingerprint data verification section 80 for verifying a plurality of minutiae extracted by the fingerprint data extraction section 10 with each other, and includes the minutia reliability calculation section 60B for calculating a minutia reliability value (a verification coincidence evaluation value which is hereinafter described) based on a result of the verification by the fingerprint data verification section 80 in place of the minutia reliability calculation section 60 in the second embodiment. Further, the fingerprint data synthesis apparatus 1B includes the fingerprint data synthesis section 40B for synthesizing the minutia data in accordance with a result of the calculation by the minutia reliability calculation section 60B in place of the fingerprint data synthesis section 40A in the second embodiment.

The minutia label allocation section 70 allocates a unique minutia label (identifier) to each of minutiae of a plurality of fingerprint data stored in the fingerprint data storage section 20. Further, when the fingerprint data verification section 80 recognizes through verification thereby that the same minutia is included commonly in two or more fingerprint data, the minutia label allocation section 70 allocates the same common minutia label to the same minutia. The same common minutia label may hereinafter referred to suitably as synthesis minutia label.

The fingerprint data verification section 80 verifies a plurality of fingerprint data stored in the fingerprint data storage section 20 with each other as described above and outputs a verification coincidence situation of the individual minutiae. The fingerprint data verification section 80 thus functions also as the common minutia searching section 30 in the first and second embodiments.

Figure 18:
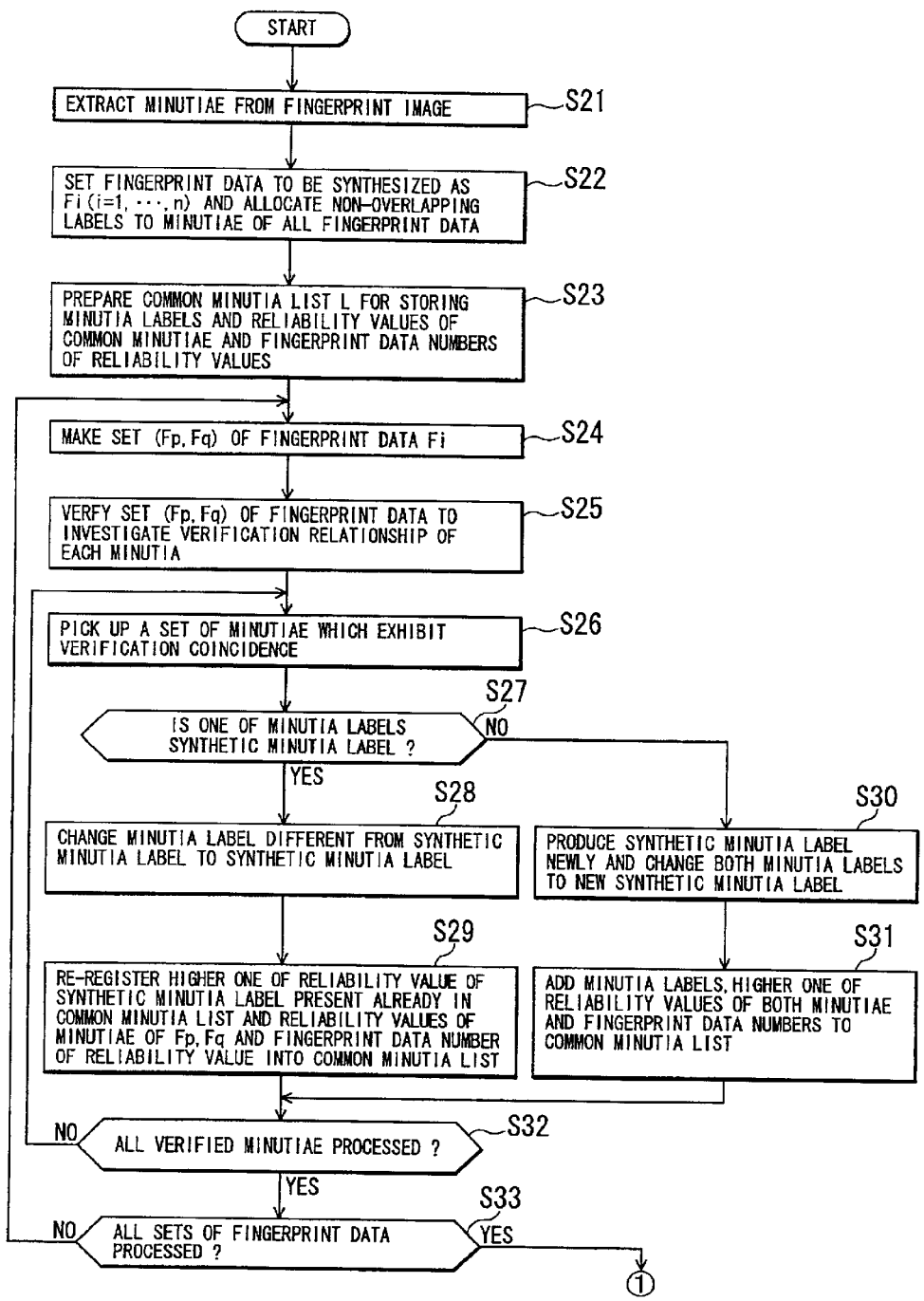
FIGS. 18 and 19 are flowcharts illustrating a fingerprint data synthesis procedure of the third embodiment.

The minutia reliability calculation section 60B calculates, for each of minutiae of a plurality of fingerprint data, a verification coincidence evaluation value for evaluation of verification coincidence possibility of the minutia as a minutia reliability value based on a verification result by the fingerprint data verification section 80, that is, based on a verification coincidence situation of each minutia as described later with reference to FIG. 18. In particular, the minutia reliability calculation section 60B acquires data of at least one of, for example, items (c1) to (c3) given below from the verification result and calculates a verification coincidence evaluation value as minutia reliability based on the acquired data.

(c1) At least one of results when two minutiae of an object of verification are verified with regard to the positions, types (end point or bifurcation) and orientations of the minutiae by the fingerprint data verification section 80;

(c2) A result when two minutiae of an object of verification are verified with regard to relational information between each of the verification object minutiae and another minutia by the fingerprint data verification section 80. The relational information here may be information of at least one of the position, type and direction of another minutia, or the number of ridges from each of the verification object minutiae to another minutia, or a connection pattern from each of the verification object minutiae to another minutia along the ridge, or the distance from each of the verification object minutia to another minutia, or the ridge length from each of the verification object minutia to another minutia; and (c3) The number of times by which each minutia exhibits verification coincidence is used as it is as a verification coincidence evaluation value.

The minutia reliability calculation section 60B further includes a function of modifying the reliability of each minutia based on the reliability of another neighboring minutia as hereinafter described with reference to FIG. 27.

The common minutia data storage section 90 stores minutia labels of common minutiae, reliability values of those minutiae to which the minutia labels have been allocated by the minutia label allocation section 70, that is, a calculation result by the minutia reliability calculation section 60B, and fingerprint data numbers with which the reliability values have been determined, that is, numbers for specifying the fingerprint data.

The fingerprint data synthesis section 40B in the third embodiment synthesizes minutia data based on a calculation result by the minutia reliability calculation section 60B and includes a synthetic fingerprint data production section 41, a positioning minutia searching section 42 and a synthetic fingerprint data storage section 43.

The synthetic fingerprint data production section 41 selects minutiae to be used for synthesis to produce synthetic fingerprint data based on fingerprint data stored in the fingerprint data storage section 20 and common minutia data stored in the common minutia data storage section 90 as hereinafter described with reference to FIG. 19.

The positioning minutia searching section 42 searches for a positioning minutia to be used for positioning, when the synthetic fingerprint data production section 41 adds newly selected minutia data to synthetic fingerprint data, the minutia data within the synthetic fingerprint data as hereinafter described with reference to FIG. 19.

Figure 32A:
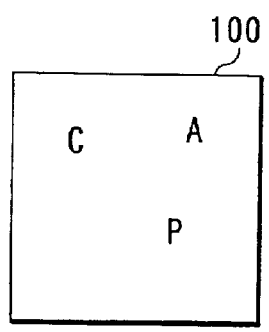
Figure 32B:
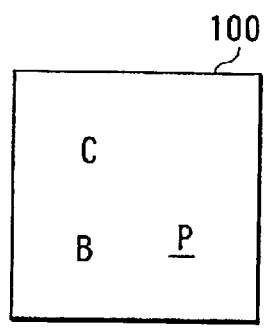

In short, when the fingerprint data synthesis section 40B produces synthetic fingerprint data, the positioning minutia searching section 42 selects a suitable minutia from among minutiae included in synthetic fingerprint data being produced and positions the minutiae of the synthetic fingerprint data with reference to the selected minutia (refer to FIGS. 32A and 32B).

Figure 30A:
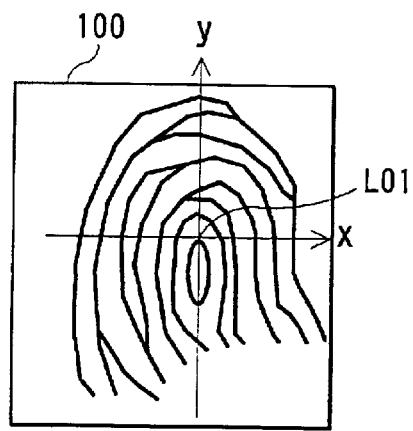
FIGS. 30A, 30B, 31A, 31B, 32A and 32B are schematic views illustrating positioning schemes of minutiae in the third embodiment.
Figure 30B:
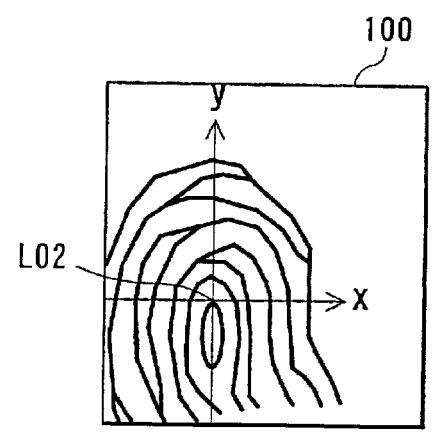

It is to be noted that the reference for positioning may not be such a minutia as described above but may alternatively be a minutia included commonly in a plurality of fingerprint data (refer to FIGS. 31A and 32B) or the center of a fingerprint determined from a fingerprint image (refer to FIGS. 30A and 30B).

The synthetic fingerprint data storage section 43 stores synthetic fingerprint data produced by the synthetic fingerprint data production section 41.

The fingerprint data synthesis section 40B further has a function of referring to a verification result of relational information between each minutia and another minutia by the fingerprint data verification section 80 to collect relational information having high reliability to produce synthetic relational information and producing synthetic fingerprint data including the synthesized relational information as relational information of the minutiae from which the synthetic fingerprint data is formed as hereinafter described with reference to FIGS. 29A to 29D.

Now, a fingerprint data synthesis procedure of the third embodiment is described with reference to a flowchart (steps S21 to S43) shown in FIGS. 18 and 19.

First, a plurality of fingerprint images picked up from the same fingertip by the fingerprint scanner 2 are inputted to the fingerprint data extraction section 10. The fingerprint data extraction section 10 extracts minutiae (end points, bifurcations), fingerprint ridge orientations, minutia distances, ridge lengths between minutiae and relational information including the number of ridges between the minutiae as well as connection patterns of fingerprint ridges through the minutiae, from each of the fingerprint images to produce fingerprint data (step S21). The fingerprint data produced for each fingerprint image are stored into the fingerprint data storage section 20.

To the minutiae of all of the fingerprint data stored in the fingerprint data storage section 20, minutia labels are individually allocated by the minutia label allocation section 70 so that they may not overlap with each other as preparations for searching for common minutiae (step S22). It is to be noted that a plurality of (n) fingerprint data to be used for synthesis are represented by Fi (i=1, . . . , n: i is a fingerprint data number).

Further, a common minutia list L for storing the minutia labels of common minutiae, reliability values of the minutiae to which the minutia labels have been allocated by the minutia label allocation section 70 and fingerprint data numbers applied when the reliability values have been calculated in a corresponding relationship to one another is prepared on the common minutia data storage section 90 (step S23).

Then, the fingerprint data verification section 80 successively produces a set (Fp, Fq) of the fingerprint data Fi (step S24) and executes a fingerprint verification process for the fingerprint data Fp and Fq until the fingerprint verification process is completed for all combinations of the fingerprint data, that is, until the discrimination of YES is obtained in step S33. It is to be noted that p and q are natural numbers equal to or greater than 1 but equal to or lower than n, and p≠q.

In particular, the fingerprint data verification section 80 first verifies the fingerprint data Fp and Fq to investigate a verification relationship (coincidence relationship or correspondence) of the minutiae at the fingerprint data Fp and Fq (step S25) and notifies the minutia label allocation section 70 and the minutia reliability calculation section 60B of a result of the investigation.

If the fingerprint data verification section 80 recognizes as a result of the verification thereby that the same minutia is included commonly in two or more fingerprint data, then the minutia label allocation section 70 produces the same common minutia label and allocates it to the same minutia. Further, the minutia label allocation section 70 notifies the common minutia data storage section 90 of the minutia label of the minutia which has been discriminated as the same minutia.

The minutia reliability calculation section 60B determines a minutia reliability value of the minutia from the verification coincidence relationship of the minutia and notifies the common minutia data storage section 90 of the minutia reliability value. The common minutia data storage section 90 stores the received label of the common minutia, the minutia reliability value and the fingerprint data number of the minutia having the minutia reliability value as a set.

Further, the minutia reliability calculation section 60B acquires data of at least one of the items (c1) to (c3) given hereinabove from the verification result and calculates a verification coincidence evaluation value as the minutia reliability based on the acquired data. Details of the scheme of the calculation are hereinafter described with reference to FIGS. 20A to 27.

Then, the fingerprint data verification section 80 picks up a set of minutiae, which have exhibited coincidence upon the verification, from the fingerprint data Fp and Fq (step S26). Then, the fingerprint data verification section 80 discriminates whether or not the minutia label of one of the minutiae is a synthesized minutia label (common minutia label) (step S27).

When the minutia label of one of the minutiae is a synthetic minutia label (common minutia label) (YES route from step S27), the fingerprint data verification section 80 changes the minutia label different from the synthetic minutia label to the synthetic minutia label (step S28). Then, the fingerprint data verification section 80 selects the highest one of the reliability value of the synthetic minutia label already stored in the common minutia list L and the reliability values of the two minutiae picked up from the fingerprint data Fp and Fq and re-registers the selected reliability value and the number of the fingerprint data from which the minutia having the selected reliability value has been extracted into the common minutia list L (step S29).

On the other hand, when none of the minutia labels of the two minutiae picked up from the fingerprint data Fp and Fq is a synthetic minutia label (NO route from step S27), the minutia label allocation section 70 produces a synthetic minutia label newly and changes the minutia labels of the two minutiae to the synthetic minutia label (step S30). Then, the minutia label allocation section 70 newly adds the changed minutia label, a higher one of the reliability values of the two minutiae and the number of the fingerprint data from which the minutia having the selected reliability value has been extracted to the common minutia list L (step S31) The processing in steps S26 to S31 described above is executed repetitively until the discrimination of YES is obtained in step S32 and consequently is executed for all minutiae of the fingerprint data Fp and Fq for which verification has been performed. Then, the fingerprint verification process in steps S24 to S32 is executed repetitively until the discrimination of YES is obtained in step S33 and consequently is performed for all combinations of the fingerprint data. Consequently, investigation for common minutiae and calculation of the minutia reliability are performed with regard to all minutiae of all fingerprint data, and results of the processing are stored into the common minutia list L of the common minutia data storage section 90.

It is to be noted that, in the present embodiment, verification between the fingerprint data Fp and Fq is performed in step S25 where the registration side fingerprint data are Fp and the input side fingerprint data are Fq. When verification is performed where the registration side fingerprint data are Fp and the input side fingerprint data are Fq in this manner, a different verification result is obtained from that when verification is performed where the registration side fingerprint data are Fq and the input side fingerprint data are Fp, and also the reliability of each minutia is different. Accordingly, in the present embodiment, the two sets of fingerprint data (Fp and Fq) are produced in permutation in step S24, and the processing in steps S24 to S32 is executed for both of the sets (Fp, Fq) and (Fq, Fp).

Figure 19:
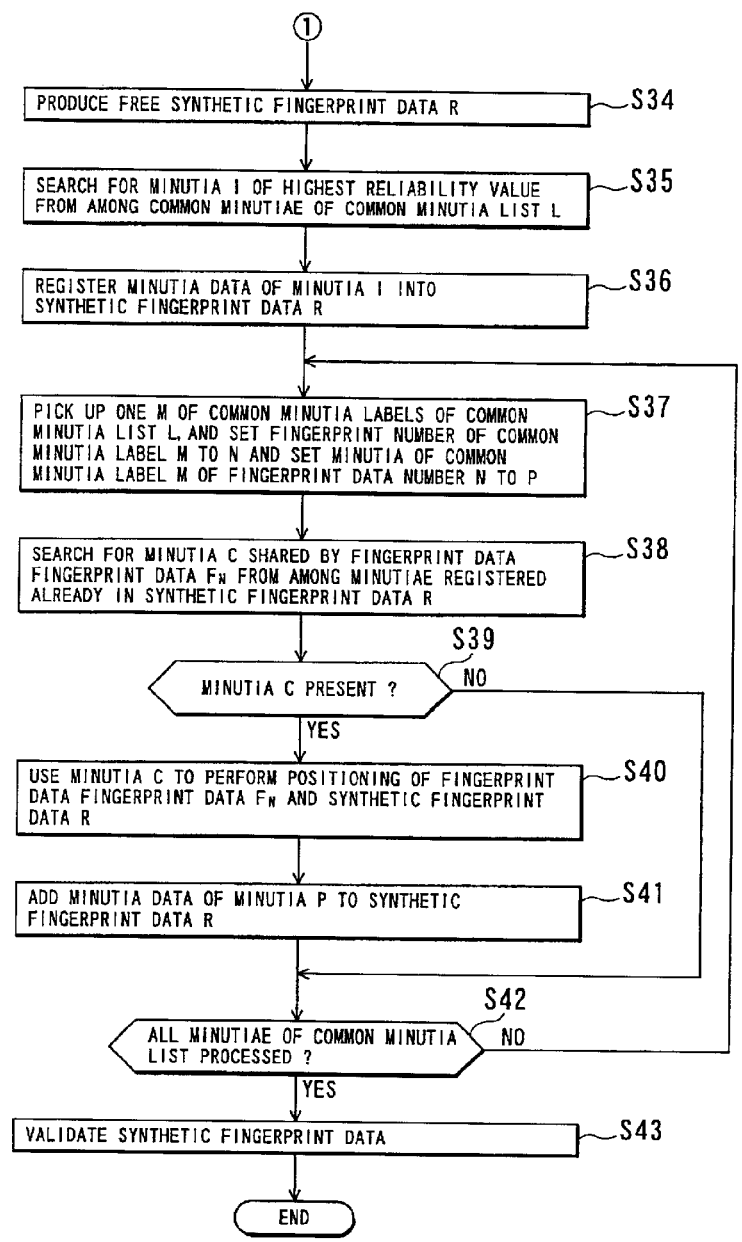

Then, the fingerprint data synthesis section 40B performs a fingerprint synthesis process in steps S34 to S42 illustrated in FIG. 19 based on the common minutia list L obtained in such a manner as described above.

The fingerprint data synthesis section 40B first secures a free area into which synthetic fingerprint data R are to be stored in the synthetic fingerprint data storage section 43 (step S34). Then, the synthetic fingerprint data production section 41 receives minutia labels of common minutiae, reliability values of the common minutiae and fingerprint data numbers from the common minutia data storage section 90.

When no minutia is included in (the area for the synthetic fingerprint data R of) the synthetic fingerprint data storage section 43, the synthetic fingerprint data production section 41 searches for a minutia I having the highest reliability value in common minutiae of the common minutia list L (step S35). Then, the synthetic fingerprint data production section 41 unconditionally registers the minutia I as synthetic fingerprint data R into the synthetic fingerprint data storage section 43 (step S36).

When a minutia or minutiae are stored already in (the area for the synthetic fingerprint data R of) the synthetic fingerprint data storage section 43 later, the synthetic fingerprint data production section 41 selects minutia data to be used for synthesis subsequently (step S37). Then, the synthetic fingerprint data production section 41 notifies the positioning minutia searching section 42 of the number of the fingerprint data to which the minutia belongs and instructs the positioning minutia searching section 42 to search for a positioning minutia. Here, the synthetic fingerprint data production section 41 selects one of the common minutia labels registered in the common minutia list L, that is, here a common minutia label represented by M. The minutia to which the common minutia label M is allocated is represented by P, and the number of the fingerprint data to which the minutia P belongs is represented by N.

The positioning minutia searching section 42 receives the instruction from the synthetic fingerprint data production section 41 and searches for a minutia C which commonly exists also in fingerprint data $F_N$ from among the minutiae registered already in the synthetic fingerprint data R as a positioning minutia (step S38). In other words, the positioning minutia searching section 42 detects whether or not there exists a minutia C commonly in the minutiae included in the fingerprint data $F_N$ in which the minutia P to be used for synthesis is present and the minutia data registered already in the synthetic fingerprint data storage section 43.

If no such a minutia C as described above is detected (NO route from step S39), then the processing advances to step S42 which is hereinafter described. However, if such a minutia C is detected (YES route from step S39), then the positioning minutia searching section 42 returns the search result (information of the minutia C) to the synthetic fingerprint data production section 41.

Then, the synthetic fingerprint data production section 41 uses the searched out minutia C to perform positioning between the fingerprint data $F_N$ and the synthetic fingerprint data R (step S40) and additionally stores the minutia data of the minutia P to be used for synthesis into the synthetic fingerprint data R of the synthetic fingerprint data storage section 43 (step S41). It is to be noted that a particular positioning scheme in step S40 is hereinafter described with reference to FIGS. 32A and 32B.

The processing in steps S37 to S41 described above is repetitively executed until the discrimination of YES is obtained in step S42 and consequently is executed for all of the common minutiae registered in the common minutia list L, thereby completing the fingerprint synthesis process for all of the common minutiae.

Then, it is finally validated by the validation section 50 whether or not the synthesis result (synthetic fingerprint data R) by the fingerprint data synthesis section 40B forms valid fingerprint data (step S43) similarly as in the first embodiment.

Subsequently, the fingerprint data synthesis procedure of the third embodiment is described in more detail with reference to FIGS. 20A to 33.

Figure 27:
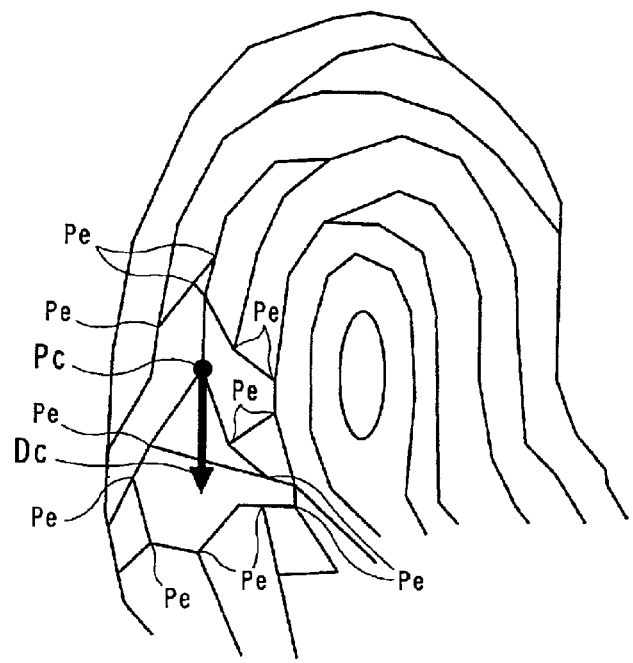
FIG. 27 is a schematic view illustrating a modification scheme of a minutia reliability value in the third embodiment.
Figure 28:
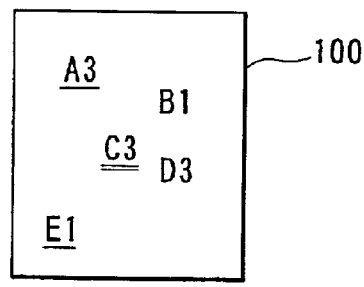
FIG. 28 is a diagrammatic view illustrating an example of a synthesis result of fingerprint data in the third embodiment.
Figure 29A:
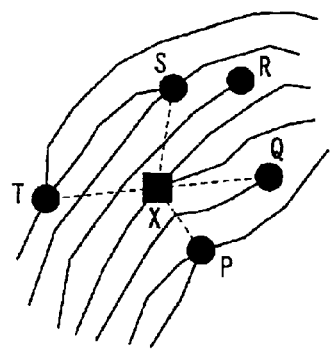
FIGS. 29A to 29D are schematic views illustrating production schemes of synthesis relationship information of minutiae in the third embodiment.
Figure 29B:
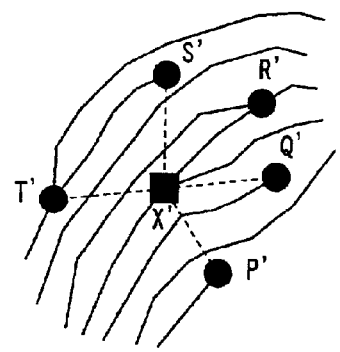
Figure 29C:
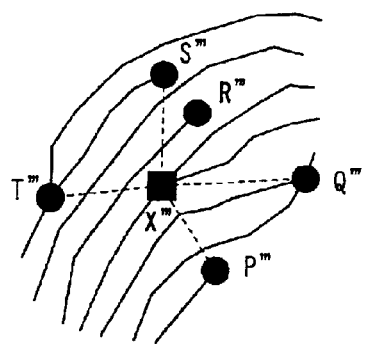
Figure 29D:
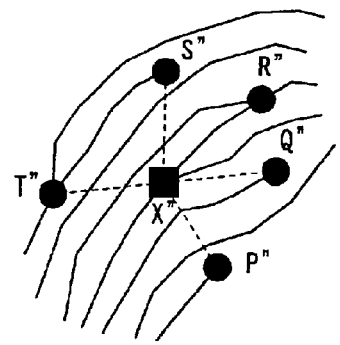
Figure 33:
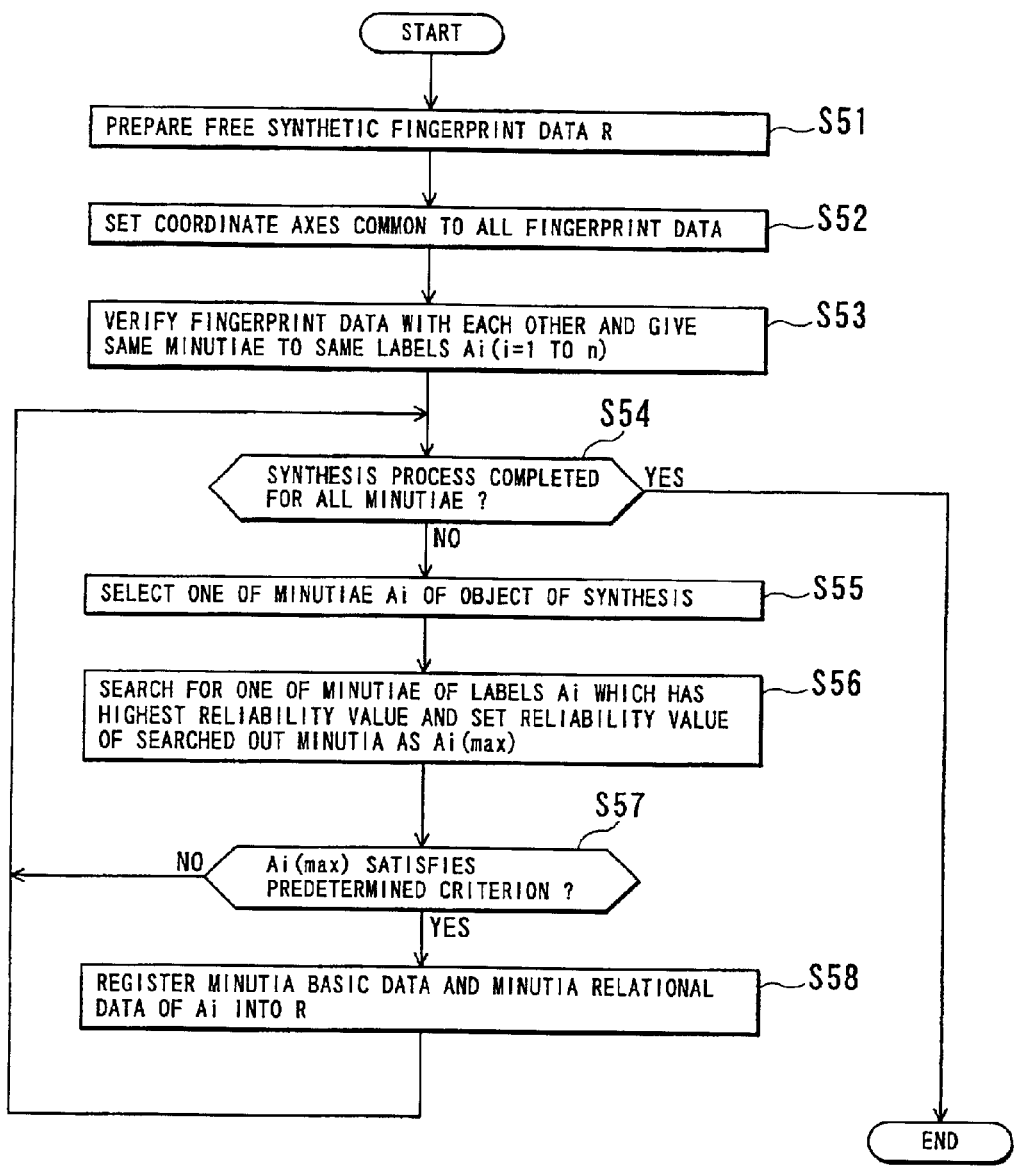
FIG. 33 is a flowchart illustrating a modification to a fingerprint data verification method in the third embodiment.

FIGS. 20A to 26C are schematic views illustrating calculation schemes of a minutia reliability value (verification coincidence evaluation value) in the present embodiment, FIG. 27 is a schematic view illustrating a modification scheme of a minutia reliability value in the present embodiment, FIG. 28 is a diagrammatic view illustrating an example of a synthesis result of fingerprint data in the present embodiment, FIGS. 29A to 29D are schematic views illustrating production schemes of synthesis relationship information of minutiae in the present embodiment, FIGS. 30A to 32B are schematic views illustrating positioning schemes of minutiae in the present embodiment, and FIG. 33 is a flow chart illustrating a modification to a fingerprint data verification method in the third embodiment.

In the calculation scheme of the minutia reliability in the second embodiment described hereinabove, the reliability value of each minutia of certain fingerprint data is calculated based on information only within the fingerprint data. In short, in the second embodiment, the minutia reliability is calculated based only on the shape of a ridge structure. In order to discriminate with certainty whether or not a minutia included in fingerprint data is correct making use of an approach different from that of the scheme of the second embodiment just described, another scheme is available wherein fingerprint data which are known as originating from the same fingerprint are verified with each other to confirm whether or not minutiae of them coincide correctly with each other. The third embodiment adopts the scheme just described to allow calculation of minutia reliability values of a higher degree of accuracy than that in the second embodiment.

First, verification between minutiae is described.

As described hereinabove, minutia data includes two different criteria of data including minutia basic data including the position, type and direction of a minutia and minutia relational data representative of a relationship between the minutia and another minutia. The verification of minutia data involves verification of data of the two different criteria.

Minutia verification where the minutia relational data is represented, for example, by the number of ridges from a noticed minutia to another minutia is examined.

Figure 20A:
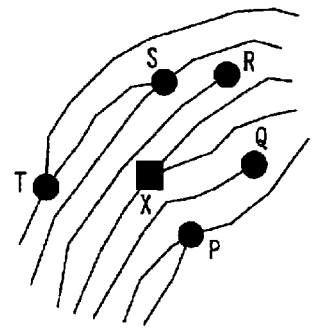
Figure 20B:
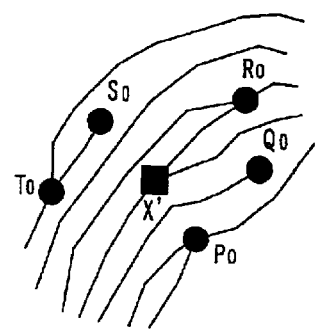
Figure 21A:
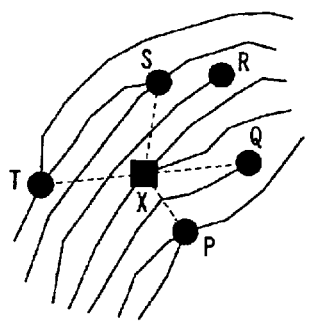
Figure 21B:
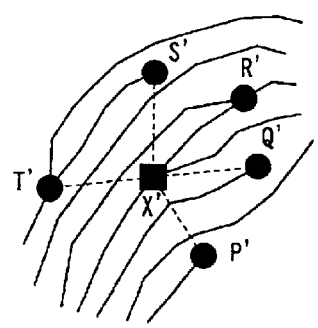
Figure 22A:
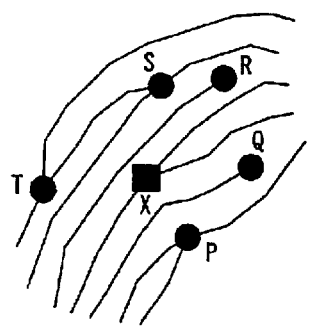
Figure 22B:
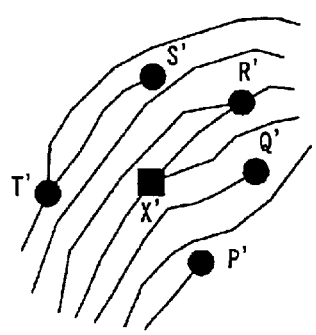

A particular example of verification of minutiae is described with reference to FIGS. 20A and 20B. The verification here is performed between a minutia X and another minutia X' of fingerprint data illustrated in FIGS. 20A and 20B, respectively. It is assumed here that the minutia X and the minutia X' are a common minutia which is included commonly in the two fingerprint data, and the minutia basic data of the position, type and orientation of the minutia X and minutia X' individually coincide with each other within a predetermined range.

First, common coordinate axis of the fingerprint data is set using the center of the fingerprint or some other suitable element, and then verification of the minutia relational data (relational information) regarding the minutia X and the minutia X' is performed. Results of the verification are such as follows:

The number of ridges from the minutia X to a minutia T and the number of ridges from the minutia X' to a minutia $T_0$ coincide with each other.

The number of ridges from the minutia X' to a minutia and the number of ridges from the minutia X' to a minutia $S_0$ do not coincide with each other.

The number of ridges from the minutia X to a minutia Q and the number of ridges from the minutia X' to a minutia $Q_0$ coincide with each other.

The number of ridges from the minutia X to a minutia P and the number of ridges from the minutia X' to a minutia $P_0$ coincide with each other.

In short, the verification of the relational information exhibits coincidence in the three-fourths and exhibits in coincidence in the remaining one-fourth.

Here, since it is known that the two fingerprint data used for the verification originate from the same fingertip, originally the minutia relational data must all exhibit coincidence.

However, since actually the condition of a fingertip in terms of sweat or dryness and the manner in which the fingertip is placed on the fingerprint scanner 2 (fingerprint inputting region 100) are different each time a fingerprint image is picked up as described hereinabove, different fingerprint images are obtained from the same fingertip. Since minutiae are extracted individually from such a plurality of fingerprint images as just described, the quite same fingerprint data may not necessarily be obtained, and such verification of the fingerprint data as described above may not exhibit full coincidence.

Since different portions of a fingertip are different in terms of a wrinkle, an injury, the softness of the skin or the like, some of minutiae extracted as fingerprint data may exhibit comparatively good repeatability while the other minutiae may exhibit comparatively poor repeatability. Production of fingerprint data only from minutiae having good repeatability, that is, minutiae having high reliability, naturally augments the performance in fingerprint verification.

Minutiae having good repeatability are minutiae which are likely to exhibit coincidence upon verification. Therefore, the minutia reliability calculation section 60B in the third embodiment can introduce the minutia reliability (verification coincidence evaluation value) in the following manner based on a result of verification of minutia data.

In the first calculation scheme of the minutia reliability (verification coincidence evaluation value), a minutia reliability value is introduced from a result of verification of minutia basic data of the position, type and direction of the minutia.

In short, two fingerprint data are verified with each other, and only those minutiae which exhibit coincidence are selected as an object of calculation of the minutia reliability. In this instance, the minutia reliability is defined, for example, as given by the following expression (5) so that, when the minutia is different in type, the reliability of the minutia is set lowest ($-\infty$), but when the minutia coincides in type, the reliability is set to a higher level as the errors in position and orientation decrease.

$$[\text{minutia reliability}] = -\{k1^*E1 + k2^*E2\} \text{ (when } \delta=1) = -\infty \text{ (when } \delta=0) \quad (5)$$

where $\delta$ is a variable which is set to 1 when the minutia coincides in type but to 0 in any other case, k1 and k2 are constants, E1 is the error in minutia position, and E2 is the error in minutia orientation. Accordingly, when the noticed minutia exhibits coincidence in all of the type, position and orientation, the minutia reliability defined by the expression (5) assumes its maximum value 0.

In the second calculation scheme for the minutia reliability (verification coincidence evaluation value), the minutia reliability is introduced from a result of verification of relational information of a minutia.

The repeatability of a relationship between a noticed minutia and minutiae present around the noticed minutia can be confirmed by confirming a result of verification of minutia relational data. Since the minutia relational data represents a ridge structure, it serves as a significant material for discrimination in verification of a minutia. In other words, since verification of minutia relational data is equivalent to verification of a ridge structure, the verification conditions are severer than those for verification of minutia basic data. Accordingly, if extraction of minutiae is unstable, that is, if minutiae are poor in repeatability, then verification of the minutia relational data exhibits a significantly poor result. A minutia reliability value which exhibits good repeatability of a minutia can be determined by use of a result of verification of minutia relational data.

In the following, the scheme of introducing the minutia reliability from a result of verification of relational information of minutiae as described above is described below with reference to FIGS. 20A to 22B.

First, verification of minutia relational data where the minutia relational data is the position, type and orientation of neighboring minutiae with respect to a noticed minutia is described. Here, it is assumed that verification is performed between the minutia X and the minutia X' of the fingerprint data illustrated in FIGS. 20A and 20B, respectively.

The term "same" hereinbelow sometimes means that minutiae coincide each other within a predetermined range in terms of the position, type and orientation. Here, the representation that "minutiae coincide with each other within a predetermined range in terms of the position, type and direction" suggests that two minutiae may sometimes be regarded as the same minutia if the positions and the directions of the two minutiae satisfy predetermined conditions even if the types of the two minutiae do not coincide with each other. Further, a neighboring minutia described hereinbelow is defined as a minutia which is within a circular region having the noticed minutia X as the center and having a predetermined radius.

Results of the verification in this instance are such as follows:

The minutia X' has a minutia (minutia $T_0$) having the same position, type and orientation as those of the minutia T which is a neighboring minutia to the minutia X.

The minutia X' does not have a minutia having the same position, type and orientation as those of the minutia which is a neighboring minutia to the minutia X.

The minutia X' does not have a minutia having the same position, type and orientation as those of the minutia R which is a neighboring minutia to the minutia X.

The minutia X' has a minutia (minutia $Q_0$) having the same position, type and orientation as those of the minutia Q which is a neighboring minutia to the minutia X.

The minutia X' has a minutia (minutia $P_0$) having the same position, type and orientation as those of the minutia P which is a neighboring minutia to the minutia X.

In short, the relational information exhibits coincidence at the three-fifths thereof but exhibits incoincidence at the remaining two-fifths thereof.

The degrees of repeatability of minutiae around a minutia can be seen from the degrees of verification coincidence of relational data to the plurality of neighboring minutiae. Accordingly, the minutia reliability of the noticed minutia is defined as a coincidence ratio of neighboring minutia relational data as given by the following expression (6) so that it may be set to a higher value as the coincidence ratio increases.

$$[\text{minutia reliability}] = N3/N4 \qquad (6)$$

where N3 is the number of coincident neighboring minutia relational data, and N4 is the total number of the neighboring minutia relational data. Accordingly, in the example shown in FIGS. 20A and 20B, the minutia reliability is 3/5=0.6.

Subsequently, verification where the number of ridges from a noticed minutia to another minutia is set and used as minutia relational data is described. Here, it is assumed that verification is performed for the minutia X and the minutia X' of the fingerprint data illustrated in FIGS. 21A and 21B, respectively. The results of verification in this instance are such as follows:

The ridge number from the minutia X to the minutia T and the ridge number from the minutia X' to the minutia T' coincide with each other.

The ridge number from the minutia X to the minutia S and the ridge number from the minutia X' to the minutia S' do not coincide with each other.

The ridge number from the minutia X to the minutia Q and the ridge number from the minutia X' to the minutia Q' coincide with each other.

The ridge number from the minutia X to the minutia P and the ridge number from the minutia X' to the minutia P' do not coincide with each other.

In short, the relational information exhibits coincidence at one half thereof but exhibits incoincidence at the remaining one half thereof.

In this manner, minutia data of a certain one minutia include ridge number relational data regarding a plurality of neighboring minutiae. To verify the minutia relational data is equivalent to verification of relational data of the ridge numbers. The degree of repeatability of a ridge structure can be seen from the degree of coincidence of a plurality of ridge number relational data. Accordingly, the minutia reliability is defined as a coincidence ratio of ridge number relational data as given by the following expression (7) so that it may be set to a higher value as the coincidence ratio increases.

$$[\text{minutia reliability}] = N5/N6 \qquad (7)$$

where N5 is the number of coincident ridge number relational data, and N6 is the total number of the ridge number relational data. Accordingly, in the example illustrated in FIGS. 21A and 21B, the minutia reliability value is 2/4=0.5.

Now, verification where ridge connection relational data (connection pattern data) from a noticed minutia to another minutia along the ridge is set and used as minutia relational data is described. Here, it is assumed that verification is performed for the minutia X and the minutia X' of the fingerprint data illustrated in FIGS. 22A and 22B, respectively. The results of verification in this instance are such as follows:

The minutia S is present on the second next ridge to the left of the minutia X. A minutia is not present on the second next ridge to the left of the minutia X'. Accordingly, the ridge connection relational data regarding the second next ridges to the left of the minutiae X and X' do not coincide with each other.

The minutia R is present on the next ridge to the left of the minutia X. The minutia R' is present on the next ridge to the left of the minutia X'. Accordingly, the ridge connection relational data regarding the next ridge to the left of the minutiae X and X' coincide with each other.

A minutia is not present on the ridge on which the minutia X is present. The minutia R' is present on the ridge on which the minutia X' is present. Accordingly, the ridge connection relational data regarding the ridges on which the minutiae X and X' are present, respectively, do not coincide with each other.

The minutia Q is present on the next ridge to the right of the minutia X. The minutia Q' is present on the next ridge to the right of the minutia X'. Accordingly, the ridge connection relational data regarding the next ridge to the right of the minutiae X and X' coincide with each other.

The minutia P is present on the second next ridge to the right of the minutia X. A minutia is not present on the second next ridge to the right of the minutia X'. Accordingly, the ridge connection relational data regarding the second next ridge to the right of the minutiae X and X' do not coincide with each other.

In short, of the five ridge connection relational data, two exhibit verification coincidence, but the remaining three do not exhibit verification coincidence.

The ridge structures around the minutia X can be verified in such a manner as described above.

Accordingly, the minutia reliability is defined as a coincidence ratio of ridge connection relational data as given, for example, by the following expression (8) so that it may be set to a higher value as the coincidence degree increases.

[minutia reliability]=$N7/N8$ (8)

where N7 is the number of ridge connection relational data which exhibit coincidence in verification, and N8 is the total number of the ridge connection relational data of the minutia X. Accordingly, in the example shown in FIGS. 22A and 22B, the minutia reliability value is $2/5=0.4$.

In the third calculation scheme for the minutia reliability (verification coincidence evaluation value), a plurality of fingerprint data are verified with each other, and a minutia reliability value is determined based on the number of verification coincidences of each minutia.

A plurality of fingerprint data which are known originating from the same fingertip in advance are verified with each other, and minutiae which exhibit coincidence in the verification are successively recorded. Then, the magnitude of the number of times by which coincidence is discriminated is defined as the reliability of the minutia.

Determination of the minutia reliability based on, for example, such three fingerprint data F1, F2 and F3 as illustrated in FIGS. 23A to 23C, respectively, is described below. In the following, a procedure of counting the number of times by which coincidence is discriminated is described below.

First, the fingerprint data F1 and the fingerprint data F2 are verified with each other, and the following results are obtained:

The minutia A and the minutia a are the same.
The minutia C and the minutia b are the same.
The minutia D and the minutia c are the same.
The minutia E and the minutia d are the same.

The same labels (common minutia labels) are allocated to the same minutiae. Where the minutia label and the number of times by which coincidence is exhibited are represented by numerical representations, the fingerprint data F1 to F3 are represented as seen in FIGS. 24A to 24C, respectively.

Then, the fingerprint data F1 and the fingerprint data F3 are verified with each other, and the following results are obtained:

The minutia A and the minutia α are the same.
The minutia B and the minutia β are the same.
The minutia C and the minutia γ are the same.
The minutia D and the minutia δ are the same.

The same labels (common minutia labels) are allocated to the same minutiae again. Where the minutia label and the number of times by which coincidence is exhibited are represented by numerical representations, the fingerprint data F1 to F3 are represented as seen in FIGS. 25A to 25C, respectively.

Further, the fingerprint data F2 and the fingerprint data F3 are verified with each other and re-labeled. As a result, the fingerprint data F1 to F3 are represented in such a manner as seen in FIGS. 26A to 26C, respectively. The numbers of times of verification coincidence obtained finally as seen in FIGS. 26A to 26C are reliability values of the individual minutiae. To count the number of times of verification coincidence is equivalent to counting the frequency of occurrences of the same minutia data.

After a minutia reliability value is calculated for a noticed minutia using any of such various calculation methods as described above, if it is detected that a large number of false minutiae are present around the noticed minutia, then even if the reliability of the noticed minutia is high, the noticed minutia itself is a false minutia with a high degree of probability.

For example, a minutia Pc shown in FIG. 27 has a direction parallel to the direction in which the ridge flows and has distances greater than a fixed distance from other minutiae Pe. In such an instance, the reliability calculated by the scheme of the second embodiment may possibly exhibit a high value. However, almost all of such minutiae Pe around the minutia Pc are false minutiae, and where this is taken into consideration, the probability that the minutia Pc itself may be a correct minutia is low.

Therefore, the minutia reliability calculation section 60B in the third embodiment performs such arithmetic operation as given, for example, by the following expression (9) to modify a minutia reliability value calculated already so that it may be decreased where a great number of minutiae which have low reliability values are present around the minutia.

[minutia reliability after modification]=[minutia reliability before modification]*$K$ (9)

where K is a ratio of those of particular other minutiae existing around the noticed minutia which have reliability values higher than a predetermined value. It is to be noted that the "particular other minutiae" typically are other minutiae existing within a region of a predetermined radius from the minutia, another minutia or minutiae connected to the minutia by a ridge and so forth.

Accordingly, when all of the "particular other minutiae" have reliability values higher than the predetermined value, K=1, and the minutia reliability value is not modified. However, where all of the "particular other minutiae" have reliability values lower than the predetermined value, K=0, and the minutia reliability value is modified to 0. However, the expression (9) above is effective only when the [minutia reliability value before modification] is a positive value. If the [minutia reliability value before modification] is a negative value, then a value which increases in inverse proportion to the ratio K above is subtracted from the [minutia reliability value before modification].

Subsequently, a modification to the scheme (fingerprint synthesis process) for arranging a plurality of fingerprint data to one fingerprint data based on minutia reliability values (verification coincidence evaluation values) calculated from a result of verification in such a manner as described above is described.

First, a coincidence relationship of minutiae present in the individual fingerprint data, that is, a relationship of the same minutiae, is investigated. The coincidence relationship is determined based on a result of verification coincidence of the minutiae by verification of the two fingerprint data. A scheme similar to that described hereinabove with reference to FIGS. 23A to 26C is used.

Then, those of the minutiae which have comparatively high reliability values are selected and used to produce one fingerprint data. For example, such one synthetic fingerprint data R as seen in FIG. 28 is produced by synthesizing three such resulting fingerprint data F1 to F3 as seen in FIGS. 26A to 26C.

It is to be noted that alphabetical characters representative of the common minutia labels in FIG. 28 are shown with and without underlines so as to indicate to which fingerprint data prior to synthesis the minutia data belong. In particular, each minutia data with no underline applied indicates that it originally belongs to the fingerprint data F1; each minutia data with a single underline applied indicates that it originally belongs to the fingerprint data F2; and the minutia data with a double underline applied indicates that it originally belongs to the fingerprint data F3.

A particular procedure for synthesis of minutia data is described with reference to a flowchart (steps S51 to S58) shown in FIG. 33.

It is to be noted that the synthesis procedure illustrated in FIG. 33 is little different from the synthesis procedure described hereinabove with reference to FIGS. 18 and 19 and is a modification to the fingerprint data verification method in the present embodiment.

First, a free area for storing fingerprint data R after minutia data synthesis is prepared (step S51).

Since the position of a fingerprint on a fingerprint image is different each time a fingerprint image is picked up, comparison of the coordinate system cannot be performed simply between a plurality of fingerprint data. Therefore, common coordinate axes are set for all fingerprint data (step S52). The origin of the common coordinate axes is set to the center of the fingerprint or a particular minutia. Also it is possible, however, to perform positioning of minutiae without setting common coordinate axes. It is to be noted that details of a positioning scheme for minutiae, that is, a scheme for determining a reference for positioning, are hereinafter described with reference to FIGS. 30A to 32.

Thereafter, all of the fingerprint data are verified with each other to investigate correspondences of fingerprint minutiae, and the same labels are allocated individually to the same minutiae. For example, the same minutiae are labeled with the same common minutia labels Ai (i=1 to n) (step S53).

Then, the following process for fingerprint synthesis (steps S54 to S58) is performed for each of the minutia labels.

First, it is discriminated whether or not the synthesis process is completed for all of the minutiae (step S54). If the synthesis process is completed (YES route from step S54), then the processing is ended.

If there remains a minutia for which the synthesis process is not completed (NO route from step S54), then one of the minutia labels Ai for which the synthesis process is to be performed but is not completed as yet is selected (step S55). Then, that one of the minutiae having the minutia labels Ai allocated thereto which has the highest reliability value is searched for, and the reliability of the thus searched out minutia is represented by Ai(max) (step S56).

Then, when the reliability value Ai(max) exceeds a predetermined value (YES route from step S57), the minutia data (minutia basic data and minutia relational data) is registered into the synthetic fingerprint data R (step S58), where after the processing returns to step S54. On the other hand, when the reliability value Ai(max) does not satisfy the predetermined criterion, that is, when the reliability value Ai(max) is equal to or lower than the predetermined value (NO route from step S57), the minutia data is excluded from the object of registration into the synthetic fingerprint data R and synthesis. Then, the processing returns to step S54.

By execution of such processing as described above for all of the minutiae which have exhibited coincidence with minutiae of another fingerprint data upon verification, the fingerprint synthesis process is completed (YES route from step S54).

On the other hand, upon synthesis of minutia by the fingerprint data synthesis section 40B, it is possible to select reliable minutia relational data from a result of verification of minutia relational data to re-produce the minutia data themselves. In particular, the fingerprint data synthesis section 40B refers to a verification result of relational information between each minutia and another minutia by the fingerprint data verification section 80 to collect that relational information (minutia relational data) which has comparatively high reliability to produce synthetic relational information and adopts the synthetic relational information as relational information of the minutiae from which the synthetic fingerprint data are formed.

For example, when such four minutia data as seen in FIGS. 29A to 29D are extracted, the verification relationship of the minutia data is such as follows:

The number of ridges between the minutia X and the minutia T is two in the four minutia data.

The number of ridges between the minutia X and the minutia S is one in one minutia data and two in the other three minutia data.

The number of ridges between the minutia X and the minutia R is one in one minutia data and zero in the other three minutia data.

The number of ridges between the minutia X and the minutia Q is zero in the four minutia data.

The number of ridges between the minutia X and the minutia P is one in one minutia data and two in the other three minutia data.

Also the minutia relational data has repeatability in this manner. Therefore, also if the frequency of occurrences of each minutia relational data is counted and those minutia data which have comparatively high frequencies of occurrences are used to produce minutia relational data in order to perform synthesis of the minutiae, minutiae having high reliability can be produced. Where the minutia relational data in the examples illustrated in FIGS. 29A to 29D are re-constructed, the following results are obtained:

The number of ridges between the minutia X and the minutia T is two.

The number of ridges between the minutia X and the minutia S is two.

The number of ridges between the minutia X and the minutia R is zero.

The number of ridges between the minutia X and the minutia Q is zero.

The number of ridges between the minutia X and the minutia P is two.

Figure 31A:
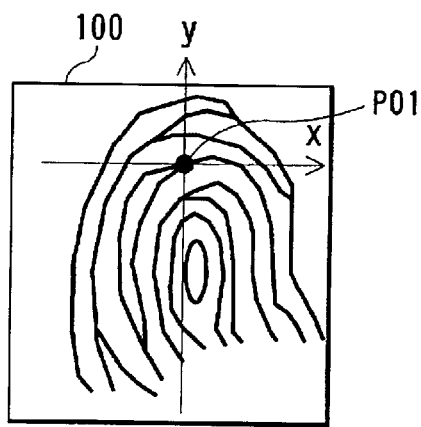
Figure 31B:
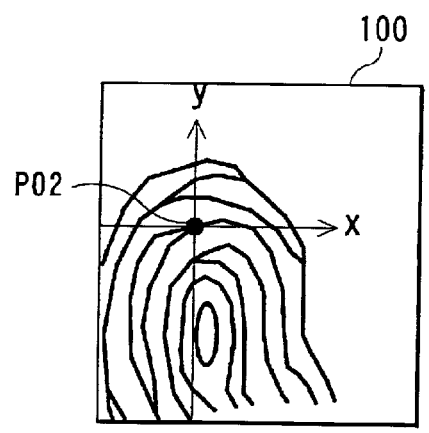

Again, in order for the fingerprint data synthesis section 40B to perform fingerprint synthesis, common coordinate axes must be set between a plurality of fingerprint data to be used for synthesis. In this instance, if common minutiae P01 and P02 are included in two fingerprint data as seen in FIGS. 31A and 31B, the minutia (P01 and P02) is used as a reference (origin) to set coordinate axes x and y common to the two fingerprint data. On the other hand, where the number of fingerprint data to be synthesized is N which is a natural number equal to or greater than 3 and all fingerprint data include the common minutiae P01 to P0N, the coordinate axes x and y common to all fingerprint data are set using the minutiae (P01 to P0N) as a reference (origin) Positioning of the minutiae from which synthetic fingerprint data are to be formed is performed based on the origin and the coordinate axes x and y set in this manner.

It is to be noted that, since the minutia which is selected as the common origin must be a stable minutia having repeatability, where several minutiae are present commonly to all of the fingerprint data to be used for synthesis, one of the minutiae which has the highest minutia reliability value is selected.

Alternatively, the center of a fingerprint which can be determined from a fingerprint image may be used as a common reference (origin) to all fingerprint data as seen in FIGS. 30A and 30B. In this instance, for example, points L01 and L02 on a ridge at the center of the fingerprint at which the ridge exhibits the greatest curvature are selected through calculation. Then, positioning of the minutiae from which synthetic fingerprint data are to be formed is performed based on coordinate axes x and y whose origin is set to the center of the fingerprint.

According to the scheme described above, in order to synthesize minutiae, common coordinate axes are set for all of fingerprint data to be used for synthesis. However, where the fingerprint data to be used for synthesis all have one-sided existing ranges of minutiae, common coordinate axes to all of the fingerprint data may not be set.

Therefore, in such an instance, each time fingerprint minutiae are synthesized, common coordinate axes are set. In particular, a minutia selected from minutiae included in synthetic fingerprint data being produced is used as a reference to effect positioning of the minutiae from which the synthetic fingerprint data are to be formed.

It is intended here to synthesize, for example, as seen in FIGS. 32A and 32B, a minutia P of fingerprint data $F_N$, which is minutia data to be used for synthesis, with synthetic fingerprint data R being produced. The procedure of the synthesis is such as described hereinabove with reference to steps S38 to S42 of FIG. 19.

In particular, a minutia C to be used for positioning is searched for from within the synthetic fingerprint data R. The minutia to be used for positioning must be a minutia which is present commonly in both of the synthetic fingerprint data R and the fingerprint data $F_N$. A minutia same as a minutia registered already in the synthetic fingerprint data R (the corresponding relationship between the minutiae has been investigated already) is searched for from within the fingerprint data $F_N$. If the same minutia is not found, then positioning between the synthetic fingerprint data R and the fingerprint data $F_N$ is impossible. Consequently, it is determined that synthesis of the minutia P is impossible, and therefore, the processing for the minutia P is ended.

On the other hand, if the same minutia between the synthetic fingerprint data R and the fingerprint data $F_N$ is found, for example, if the minutia C is found in the examples shown in FIGS. 32A and 32B, then the minutia C is used to perform the positioning. After the positioning is performed, the minutia data of the minutia P of the fingerprint data $F_N$ is included into the synthetic fingerprint data R, thereby completing the minutia synthesis.

In this manner, with the fingerprint data synthesis apparatus 1B of the third embodiment of the present invention, a plurality of fingerprint data are verified with each other, and a verification coincidence evaluation value based on a result of the verification is calculated as a reliability value of each minutia. Therefore, a reliability value which reflects a verification algorithm for fingerprints can be calculated. If minutiae are selected based on such reliability values and used for production of synthetic fingerprint data, then the fingerprint verification performance is augmented obviously.

Further, if, for example, the expressions (5) to (8) are used to introduce a verification coincidence evaluation value as a minutia reliability value from a verification result or a number of times of verification coincidence of minutia data, then the verification coincidence evaluation values of minutiae having good repeatability and minutiae having poor repeatability exhibit significant differences. This facilitates discrimination of false minutiae, and consequently, synthetic fingerprint data having high reliability can be produced readily and with certainty.

Furthermore, if a high reliability value is obtained unexpectedly as a result of calculation with regard to a certain noticed minutia although a large number of false minutiae are present around the noticed minutia, then the noticed minutia has a high degree of possibility that it is a false minutia. Therefore, it is desirable to exclude the noticed minutia from the object of selection. Thus, for example, the expression (9) is used to modify the reliability value of the noticed minutia in accordance with the reliability values of the neighboring minutiae. This makes the reliability values of the neighboring minutiae reflected on the reliability value of the noticed minutia and allows the minutia, which is a false minutia with a high degree of probability, to be excluded from the object of selection. Consequently, synthetic fingerprint data of high reliability can be produced with a higher degree of certainty.

Further, synthetic relational information produced by referring to a result of verification of relational information between each minutia and another minutia to collect minutia relational data having high reliability is used as relational information of minutiae from which synthetic fingerprint data are to be formed. Consequently, the relational information of the minutiae from which the synthetic fingerprint data is to be formed can be modified so as to have a higher degree of reliability. Consequently, synthetic fingerprint data of high reliability can be produced with a higher degree of certainty.

Upon positioning, a minutia included commonly in a plurality of fingerprint data or the center of a fingerprint determined from a fingerprint image is used as a reference. Consequently, positioning of minutiae selected from the plurality of fingerprint data can be performed readily, and synthetic fingerprint data can be produced readily and with certainty.

Further, if a minutia selected suitably from among minutiae included already in synthetic fingerprint data being produced is used as a reference for positioning, then even if a plurality of fingerprint data include minutiae of regions which are different a little from each other, the selected minutiae can be positioned readily. Consequently, synthetic fingerprint data can be produced readily and with certainty.

[4] Others

It is to be noted that the present invention is not limited to the specific embodiments described above but can be carried out in various modified forms without departing from the spirit and scope of the present invention.

For example, while the biometric information in the embodiments described above is fingerprint data, the present invention is not limited to this but can be applied also to a system which identifies an individual using biometric information such as, for example, a palm print, a finger shape, a palm shape, voice, the retina, the iris, a face picture, a dynamic signature, a blood vessel pattern or a keystroke. Also in such applications, similar effects and advantages are achieved.

In this instance, feature elements are extracted from each of a plurality of sets of raw biometric data obtained from the same organism to produce biometric information including information regarding the feature elements for each of the sets of raw biometric data, and a correspondence of the feature elements is investigated between the plurality of biometric information to search for the same feature elements included commonly in two or more of the biometric information as common feature elements. Then, one of the common feature elements is selected as a feature element representative of the common feature elements to synthesize the plurality of biometric information to produce one synthetic biometric information, and then the synthetic biometric information is validated.

The synthetic biometric information produced by extracting the feature elements from each of the plurality of sets of raw biometric data and synthesizing the extracted feature elements into one data in this manner is used. Consequently, the synthetic biometric information can be produced using the feature elements having high reliability.

Accordingly, biometric information including correct feature elements extracted accurately from organism information can be produced, which allows realization of a high verification performance in a system which identifies an individual using biometric information.

Further, since feature elements over a wide range can be extracted accurately from a plurality of sets of raw biometric data originating from different pickup regions to produce biometric information, a stabilized verification performance can be realized in a system of the type described above.

Furthermore, since it is validated whether or not synthetic biometric information is valid, only the biometric information which is valid as a result of synthesis can be used. Consequently, authentication of raw biometric data is performed using biometric information having comparatively high reliability, and therefore, a higher verification performance can be achieved.

What is claimed is:

1. An automated fingerprint data synthesis method, comprising:

extracting minutiae from each of a plurality of fingerprint images to produce respective fingerprint data sets including information regarding the minutiae for each of the respective fingerprint images;

investigating a correspondence of the minutiae between the plurality of fingerprint data sets to search for substantially same minutiae that two or more of the plurality of fingerprint data sets have in common; and selectively determining which minutiae of the common minutiae to use as representatives of the common minutiae to synthesize the plurality of fingerprint data sets to produce one synthetic fingerprint data sets, the synthetic fingerprint data set comprising minutiae such that each of the two or more fingerprint data sets provide selectively determined minutiae that represent corresponding same minutiae in one or more of the other fingerprint data sets.

2. A method according to claim 1, further comprising validating that the synthetic fingerprint data is valid as fingerprint data.

3. A fingerprint data synthesis apparatus, comprising:

a fingerprint data extraction section for extracting minutiae from each of a plurality of fingerprint images to produce fingerprint data including information regarding the minutiae for each of the fingerprint images;

a fingerprint data storage section for storing the plurality of fingerprint data produced by said fingerprint data extraction section;

a common minutia searching section for investigating a correspondence of the minutiae between the plurality of fingerprint data to search for the same minutiae included commonly in two or more of the plurality of fingerprint data as common minutiae;

a fingerprint data synthesis section for selecting one of the common minutiae as a minutia representative of the common minutiae to synthesize the plurality of fingerprint data to produce one synthetic fingerprint data; and a validation section for validating the synthetic fingerprint data.

4. The fingerprint data synthesis apparatus as claimed in claim 3, wherein said validation section confirms at least one of validity of a range of presence of the minutiae in the synthetic fingerprint data, validity of one-sidedness of presence of the minutiae in the synthetic fingerprint data, validity of relational information between the minutiae in the synthetic fingerprint data and validity of the number of the minutiae in the synthetic fingerprint data to validate the synthetic fingerprint data.

5. The fingerprint data synthesis apparatus as claimed in claim 4, wherein said validation section numerically evaluates and confirms any of the criteria of validity and determines the validity of the synthetic fingerprint data based on one or more evaluation values obtained by numerically evaluating the validity.

6. The fingerprint data synthesis apparatus as claimed in claim 3, further comprising a minutia reliability calculation section for calculating a reliability value of each of the minutiae of the plurality of fingerprint data, and wherein said fingerprint data synthesis section selects the minutia representative of the common minutiae based on the reliability values calculated by said minutia reliability calculation section.

7. The fingerprint data synthesis apparatus as claimed in claim 6, wherein said minutia reliability calculation section calculates the reliability value of each of the minutiae based on a difference between an orientation of the minutia and an orientation of a ridge.

8. The fingerprint data synthesis apparatus as claimed in claim 6, wherein said minutia reliability calculation section calculates the reliability value of each of the minutiae based on a length of a ridge or a distance from the minutia to a neighboring minutia.

9. The fingerprint data synthesis apparatus as claimed in claim 6, wherein said minutia reliability calculation section calculates the reliability value of each of the minutiae based on a distance from the minutia to a neighboring ridge.

10. The fingerprint data synthesis apparatus as claimed in claim 6, wherein said minutia reliability calculation section calculates the reliability value of each of the minutiae based on a positional relationship of the minutia to a neighboring minutia.

11. The fingerprint data synthesis apparatus as claimed in claim 6, further comprising a verification section for verifying the plurality of fingerprint data, and wherein said minutia reliability calculation section calculates, for each of the minutiae in the plurality of fingerprint data, a verification coincidence evaluation value for evaluation of verification coincidence possibility of the minutia as the reliability value based on a result of the verification by said verification section.

12. The fingerprint data synthesis apparatus as claimed in claim 11, wherein said minutia reliability calculation section calculates the verification coincidence evaluation value based on at least one of results of verification of two minutiae of an object of verification with regard to a position, a type and an orientation by said verification section.

13. The fingerprint data synthesis apparatus as claimed in claim 11, wherein said minutia reliability calculation section calculates the verification coincidence evaluation value based on a result of verification of two minutiae of an object of verification with regard to relational information between each of the verification object minutiae and another minutia by said verification section.

14. The fingerprint data synthesis apparatus as claimed in claim 13, wherein the relational information is at least one of a position, a type and an orientation of the other minutia.

15. The fingerprint data synthesis apparatus as claimed in claim 13, wherein the relational information is the number of ridges from each of the minutiae of the verification object to the other minutia.

16. The fingerprint data synthesis apparatus as claimed in claim 13, wherein the relational information is a connection pattern from each of the minutiae of the verification object to the other minutia along a ridge.

17. The fingerprint data synthesis apparatus as claimed in claim 11, wherein said minutia reliability calculation section calculates the number of times of verification coincidence of each of the minutiae as the verification coincidence evaluation value.

18. The fingerprint data synthesis apparatus as claimed in claim 11, wherein said verification section functions also as said common minutia searching section.

19. The fingerprint data synthesis apparatus as claimed in claim 11, wherein said fingerprint data synthesis section refers to a result of the verification of relational information between each of the minutiae and another minutia by said verification section, and collects that relational information which has high reliability to produce synthesized relational information, and uses the synthesized relational information as the relational information of the minutiae from which the synthetic fingerprint data are formed.

20. The fingerprint data synthesis apparatus as claimed in claim 6, wherein said minutia reliability calculation section modifies the reliability value of each of the minutiae based on the reliability value or values of a neighboring minutia or minutiae.

21. The fingerprint data synthesis apparatus as claimed in claim 3, wherein, when said fingerprint data synthesis section produces the synthetic fingerprint data, said fingerprint data synthesis section performs positioning of the minutiae from which the synthetic fingerprint data are produced with reference to a minutia included commonly in the plurality of fingerprint data.

22. The fingerprint data synthesis apparatus as claimed in claim 3, wherein, when said fingerprint data synthesis section produces the synthetic fingerprint data, said fingerprint data synthesis section performs positioning of the minutiae from which the synthetic fingerprint data are produced with reference to the core of a fingerprint determined from each of the fingerprint images.

23. The fingerprint data synthesis apparatus as claimed in claim 3, wherein, when said fingerprint data synthesis section produces the synthetic fingerprint data, said fingerprint data synthesis section performs positioning of the minutiae from which the synthetic fingerprint data are produced with reference to a minutia selected from among the minutiae included in the synthetic fingerprint data being produced.

24. A computer-readable recording medium on which a fingerprint data synthesis program is recorded for causing a computer to function as:

a fingerprint data extraction section for extracting minutiae from each of a plurality of fingerprint images to produce fingerprint data including information regarding the minutiae for each of the fingerprint images;

a common minutia searching section for investigating a correspondence of the minutiae between the plurality of fingerprint data to search for the same minutiae included commonly in two or more of the plurality of fingerprint data as common minutiae;

a fingerprint data synthesis section for selecting one of the common minutiae as a minutia representative of the common minutiae to synthesize the plurality of fingerprint data to produce one synthetic fingerprint data; and a validation section for validating the synthetic fingerprint data.

25. A biometric information synthesis method, comprising the steps of:

extracting feature elements from each of a plurality of sets of raw biometric data obtained from the same organism to produce biometric information including information regarding the feature elements for each of the sets of raw biometric data;

investigating a correspondence of the feature elements between the plurality of biometric information to search for the same feature elements included commonly in two or more of the sets of biometric information as common feature elements;

selecting one of the common feature elements as a feature element representative of the common feature elements to synthesize the plurality of biometric information to produce one synthesized biometric information; and validating the synthesized biometric information.

26. A method of producing a synthetic fingerprint data set to be used for fingerprint verification, the method comprising:

extracting a first set of minutiae from a first fingerprint image of a fingerprint;

extracting a second set of minutiae from a second fingerprint image of the fingerprint; and creating a synthetic fingerprint data set by selectively determining which minutiae that are common to both sets are to be included in the in the synthetic fingerprint data set as representative of their corresponding counterparts in the other set.

27. A method according to claim 26, wherein the determining is based on the minutiae common to both sets.

28. A method according to claim 26, wherein the determining comprises determining for individual common minutiae whether or not to include the minutiae in the synthetic fingerprint data.

29. A method according to claim 26, wherein the selective determining is based on reliability measures of the common minutiae.

30. A method according to claim 26, further comprising automatically analyzing the synthetic fingerprint data set to determine whether it is a valid representation of the fingerprint.

* * * * *

UNITED STATES PATENT AND TRADEMARK OFFICE
CERTIFICATE OF CORRECTION

PATENT NO. : 6,961,452 B2
APPLICATION NO. : 09/803155
DATED : November 1, 2005
INVENTOR(S) : Yusaku Fujii It is certified that error appears in the above-identified patent and that said Letters Patent is hereby corrected as shown below:

Col. 39, line 47, delete "sets" (second occurrence) and insert --set--, therefor.

Col. 42, line 45, after "included" delete "in the" (first occurrence).

Signed and Sealed this

Twenty-fifth Day of July, 2006

JON W. DUDAS
*Director of the United States Patent and Trademark Office*